US008494845B2

(12) United States Patent
Yoshioka et al.

(10) Patent No.: US 8,494,845 B2
(45) Date of Patent: Jul. 23, 2013

(54) SIGNAL DISTORTION ELIMINATION APPARATUS, METHOD, PROGRAM, AND RECORDING MEDIUM HAVING THE PROGRAM RECORDED THEREON

(75) Inventors: Takuya Yoshioka, Kyoto (JP); Takafumi Hikichi, Kyoto (JP); Masato Miyoshi, Kyoto (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1315 days.

(21) Appl. No.: 11/913,241

(22) PCT Filed: Feb. 16, 2007

(86) PCT No.: PCT/JP2007/052874

§ 371 (c)(1),
(2), (4) Date: Oct. 31, 2007

(87) PCT Pub. No.: WO2007/094463

PCT Pub. Date: Aug. 23, 2007

(65) Prior Publication Data

US 2008/0189103 A1 Aug. 7, 2008

(30) Foreign Application Priority Data

Feb. 16, 2006 (JP) ................................ 2006-039326
Sep. 6, 2006 (JP) ................................ 2006-241364

(51) Int. Cl.

| | |
|---|---|
| ***G10L 21/02*** | (2006.01) |
| ***G10L 19/14*** | (2006.01) |
| ***G10L 19/02*** | (2006.01) |
| ***G10L 15/20*** | (2006.01) |
| ***G10L 13/00*** | (2006.01) |

(52) U.S. Cl.
USPC ........... 704/226; 704/205; 704/203; 704/204; 704/211; 704/233; 704/262; 704/263

(58) Field of Classification Search
USPC ................. 704/226, 205, 203, 204, 211, 233, 704/262, 263; 381/63, 66, 71.12
See application file for complete search history.

(56) References Cited

U.S. PATENT DOCUMENTS 4,672,665 A * 6/1987 Nagai et al. .............. 379/406.11
5,574,824 A * 11/1996 Slyh et al. ..................... 704/226

(Continued)

FOREIGN PATENT DOCUMENTS

JP 8-506434 7/1996
JP 2001-175298 6/2001

(Continued)

OTHER PUBLICATIONS

Mandi Triki and Dirk T.M. Slock. "Blind Dereverberation of a Single Source Based on Multichannel Linear Prediction," In Proc. of IWAENC, Sep. 2005.*

(Continued)

*Primary Examiner* — Edgar Guerra-Erazo
(74) *Attorney, Agent, or Firm* — Oblon, Spivak, McClelland, Maier & Neustadt, L.L.P.

(57) ABSTRACT

Provided is a signal distortion elimination apparatus comprising: an inverse filter application means that outputs the signal obtained by applying an inverse filter to an observed signal as a restored signal when a predetermined iteration termination condition is met and outputs the signal obtained by applying the inverse filter to the observed signal as an ad-hoc signal when the predetermined iteration termination condition is not met; a prediction error filter calculation means that segments the ad-hoc signal into frames and outputs a prediction error filter of each frame obtained by performing linear prediction analysis of the ad-hoc signal of each frame; an inverse filter calculation means that calculates an inverse filter such that a concatenation of innovation estimates of the respective frames becomes mutually independent among their samples, where the innovation estimate of a single frame (an innovation estimate) is the signal obtained by applying the prediction error filter of the corresponding frame to the ad-hoc signal of the corresponding frame, and outputs the inverse filter; and a control means that iteratively executes the inverse filter application means, the prediction error filter calculation means and the inverse filter calculation means until the iteration termination condition is met.

12 Claims, 14 Drawing Sheets

U.S. PATENT DOCUMENTS

| | | | | |
|---|---|---|---|---|
| 5,761,318 | A * | 6/1998 | Shimauchi et al. | 381/66 |
| 5,774,562 | A * | 6/1998 | Furuya et al. | 381/66 |
| 7,533,017 | B2 * | 5/2009 | Gotanda et al. | 704/226 |
| 7,562,013 | B2 * | 7/2009 | Gotanda et al. | 704/228 |
| 2003/0076947 | A1 * | 4/2003 | Furuta et al. | 379/406.01 |
| 2003/0206640 | A1 * | 11/2003 | Malvar et al. | 381/93 |
| 2005/0171785 | A1 * | 8/2005 | Nomura et al. | 704/500 |
| 2006/0210089 | A1 * | 9/2006 | Tashev et al. | 381/66 |
| 2007/0055511 | A1 * | 3/2007 | Gotanda et al. | 704/233 |
| 2007/0100615 | A1 * | 5/2007 | Gotanda et al. | 704/226 |

FOREIGN PATENT DOCUMENTS

| | | |
|---|---|---|
| JP | 2002-258897 | 9/2002 |
| JP | 2004-64584 | 2/2004 |

OTHER PUBLICATIONS

Miyoshi, M.; Kaneda, Y., "Inverse filtering of room acoustics," Acoustics, Speech and Signal Processing, IEEE Transactions on , vol. 36, No. 2, pp. 145,152, Feb. 1988.*

Takuya Yoshioka, et al., "Second-Order Statistics Based Dereverberation by Using Nonstationarity of Speech", IWAENC 2006, XP002534800, Sep. 12-14, 2006, pp. 1-4.

Kinoshita, Keisuke et al., "Spectral Subtraction Steered by Multi-Step Forward Linear Prediction for Single Channel Speech Dereverberation", The Acoustical Society of Japan, pp. 511-512, 2006 (with English Translation).

Hikichi, Takafumi et al., "Blind Dereverberation Based on Estimates of Signal Transmission Channels Without Precise Information on Channel Order", The Acoustical Society of Japan, pp. 601-602, 2005 (with English Translation).

Hikichi, Takafumi et al., "Dereverberation of Speech Signals based on Linear Prediction", The Acoustical Society of Japan, pp. 757-758, 2004 (with English Translation).

Miyoshi, Masato et al., "Blind Equalization of a Signal Transmission Channel Based on Linear Prediction", The Acoustical Society of Japan, pp. 535-536, 2003 (with English Translation).

Gillespie, Bradford W et al., "Speech Dereverberation Via Maximum-Kurtosis Subband Adaptive Filtering", IEEE International Conference on Acoustics, Speech, and Signal Processing, pp. 3701-3704, 2001.

Rabiner, L.R. et al., "Digital Processing of Speech Signals", Bell Laboratories, Incorporated, 1978.

Yoshioka, Takuya et al., "Robust Decomposition of Inverse Filter of Channel and Prediction Error Filter of Speech Signal for Dereverberation", Proceedings of the 14$^{th}$ European Signal Processing Conference (EUSIPCO 2006), CD-ROM Proceedings, Florence, 2006.

Hyvarinen, A. et al., "Independent Component Analysis", John Wiley & Sons, Inc., 2001.

Abed-Meraim, Karim, et al., "Prediction Error Method for Second-Order Blind Identification", IEEE Trans. Signal Processing, vol. 45, No. 3, pp. 694-705, 1997.

Kuttruff, Heinrich, "Room Acoustics. Elsevier Applied Science", Third edition, p. 237, 1991.

"Linear Predictive Coding of Speech", pp. 396-413, 1978.

Matsuoka, Kiyotoshi, et al., "A Neural Net for Blind Separation of Nonstationary Signals", Neural Networks, vol. 8, No. 3, pp. 411-419, 1995.

Shalvi, Ofir et al., "New Criteria for Blind Deconvolution of Nonminimum Phase Systems (Channels)", IEEE Transactions on Information Theory, vol. 36, No. 2, pp. 312-321, 1990.

European Office Action issued Jul. 22, 2011, in Patent Application No. 07 714 404.6.

* cited by examiner

RASTI CURVE AGAINST OBSERVED SIGNAL LENGTH

EXAMPLE OF ENERGY DECAY CURVE BEFORE AND AFTER DEREVERBERATION

SIGNAL DISTORTION ELIMINATION APPARATUS, METHOD, PROGRAM, AND RECORDING MEDIUM HAVING THE PROGRAM RECORDED THEREON

TECHNICAL FIELD

The present invention relates to a technology for eliminating distortion of a signal.

BACKGROUND ART

When observation of a signal is performed in an environment where reflections, reverberations, and so on exist, the signal is observed as a convolved version of a clean signal with reflections, reverberations, and so on. Hereafter, the clean signal will be referred to as an "original signal", and the signal that is observed will be referred to as an "observed signal". In addition, the distortion convolved on the original signal such as reflections, reverberations, and so on will be referred to as "transfer characteristics". Accordingly, it is difficult to extract the characteristics inherent in the original signal from the observed signal. Conventionally, various techniques of signal distortion elimination have been devised to resolve this inconvenience. Signal distortion elimination is a processing for eliminating transfer characteristics convolved on an original signal from an observed signal.

A signal distortion elimination processing disclosed in Non-patent literature 1 will now be described as an example of conventional signal distortion elimination methods with reference to FIG. 15. A prediction error filter calculation unit (901) performs frame segmentation on an observed signal, and performs linear prediction analysis on the observed signals included in the respective frames in order to calculate prediction error filters. In the present specification, a filter refers to a digital filter, and calculating so-called filter coefficients that operate on samples of a signal may be simply expressed as "calculating a filter". A prediction error filter application unit (902) applies the above-described prediction error filter calculated for each frame to the observed signal of the corresponding frame. An inverse filter calculation unit (903) calculates an inverse filter that maximizes the normalized kurtosis of the signal obtained by applying the inverse filter to the prediction error filter-applied signal. An inverse filter application unit (904) obtains a distortion-reduced signal (restored signal) by applying the above-described calculated inverse filter to the observed signal.

Non-patent literature 1: B. W. Gillespie, H. S. Malvar and D. A. F. Florencio, "Speech dereverberation via maximum-kurtosis subband adaptive filtering," IEEE International Conference on Acoustics, Speech, and Signal Processing, pp. 3701-3704, 2001.

DISCLOSURE OF THE INVENTION

Problems to be Solved by the Invention

The conventional signal distortion elimination method described above assumes that the characteristics inherent in the original signal contribute significantly to the short-lag autocorrelations within the respective frames of the observed signal, and that the transfer characteristics contributes significantly to the long-lag autocorrelations over the frames. Based on this assumption, the above-described conventional method removes the contribution of the characteristics inherent in the original signal from the observed signal by applying the prediction error filters to the frame-wise observed signals obtained by segmenting the entire observed signal into frames.

However, since this assumption is only a rough approximation, the accuracy of the estimated inverse filter is insufficient. In other words, because the prediction error filters calculated from the observed signal are influenced by the transfer characteristics, it is impossible to accurately remove only the characteristics inherent in the original signal. As a result, the accuracy of the inverse filter calculated from the prediction error filter-applied signal is not satisfactory. Accordingly, compared to the original signal, the signal obtained by applying the inverse filter to the observed signal still contains some non-negligible distortion.

In consideration of the above, the objective of the present invention is to obtain a highly accurate restored signal by eliminating distortion attributable to transfer characteristics from an observed signal.

Means to Solve the Problems

In order to solve the above problem, a signal distortion elimination apparatus of the present invention comprises: an inverse filter application means that applies a filter (hereinafter referred to as an inverse filter) to an observed signal when a predetermined iteration termination condition is met, followed by outputting the results thereof as a restored signal, and when the iteration termination condition is not met, applies the inverse filter to the observed signal, followed by outputting the results thereof as an ad-hoc signal; a prediction error filter calculation means that segments the ad-hoc signal into frames, and outputs a prediction error filter of each of frames obtained by performing linear prediction analysis on the ad-hoc signal of each frame; an inverse filter calculation means that calculates an inverse filter such that the samples of a concatenation of innovation estimates of the respective frames (hereinafter referred to as an innovation estimate sequence) become mutually independent, where the innovation estimate of a single frame (hereinafter referred to as an innovation estimate) is a signal obtained by applying the prediction error filter of the corresponding frame to the ad-hoc signal of the corresponding frame, followed by outputting the inverse filter; and a control means that iteratively executes the inverse filter application means, the prediction error filter calculation means and the inverse filter calculation means until the iteration termination condition is met.

In the present invention, an inverse filter is calculated such that the samples of the signal (innovation estimate sequence), which is obtained by applying the prediction error filter calculated on the basis of the ad-hoc signal to the ad-hoc signal which is obtained by applying the inverse filter to the observed signal in order to eliminate transfer characteristics, become mutually independent. Subsequently, a restored signal is obtained by applying the inverse filter to the observed signal when a predetermined iteration termination condition is met.

The signal distortion elimination apparatus described above may be arranged so that: the prediction error filter calculation means performs linear prediction analysis on the ad-hoc signal of each frame in order to calculate either a prediction error filter that minimizes the sum of the variances of the respective innovation estimates over all the frames or a prediction error filter that minimizes the sum of the log variances of the respective innovation estimates over all the frames, and outputs a prediction error filter for each frame; and the inverse filter calculation means calculates an inverse filter that maximizes the sum of the normalized kurtosis values of the respective innovation estimates over all the frames as the inverse filter that makes the samples of the above-mentioned innovation estimate sequence become mutually independent, and outputs this inverse filter.

This configuration is intended to calculate the set of prediction error filters and an inverse filter that minimizes the mutual information using an altering variables method, where the mutual information is used as a measure of the independence among the samples of the innovation sequence. A detailed description thereof will be presented later.

Alternatively, the signal distortion elimination apparatus described above may be arranged so that: the prediction error filter calculation means performs linear prediction analysis on the ad-hoc signal of each frame in order to calculate either a prediction error filter that minimizes the sum of the variances of the respective innovation estimates over all the frames or a prediction error filter that minimizes the sum of the log variances of the respective innovation estimates over all the frames, and outputs a prediction error filter for each frame; and the inverse filter calculation means calculates, as the inverse filter that makes the samples of the above-mentioned innovation estimate sequence become mutually independent, either an inverse filter that minimizes the sum of the variances of the respective innovation estimates over all the frames or an inverse filter that minimizes the sum of the log variances of the respective innovation estimates over all the frames, and outputs this inverse filter.

This configuration is intended to calculate the set of prediction error filters and an inverse filter that minimizes the mutual information using an altering variables method, where the mutual information is used as a measure of the independence among the samples of the innovation sequence. This configuration enables us to calculate a prediction error filter and an inverse filter using the altering variables method without using higher order statistics of the signal.

In the signal distortion elimination apparatus described above, a pre-whitening process may be prepositioned and processing similar to those described above may be performed on a whitened signal obtained through pre-whitening. More specifically, the signal distortion elimination apparatus may be comprised of: a whitening filter calculation means that outputs a whitening filter obtained by performing linear prediction analysis on an observed signal; a whitening filter application means that outputs a whitened signal by applying the whitening filter to the observed signal; an inverse filter application means that applies a filter (hereinafter referred to as an inverse filter) to the whitened signal when a predetermined iteration termination condition is met, followed by outputting the results thereof as a restored signal, and when the iteration termination condition is not met, applies the inverse filter to the whitened signal, followed by outputting the results thereof as an ad-hoc signal; a prediction error filter calculation means that segments the ad-hoc signal into frames, and outputs a prediction error filter of each of frames obtained by performing linear prediction analysis on the ad-hoc signal of each frame; an inverse filter calculation means that calculates an inverse filter such that the samples of a concatenation of innovation estimates of the respective frames (hereinafter referred to as an innovation estimate sequence) become mutually independent, where the innovation estimate of a single frame (hereinafter referred to as an innovation estimate) is a signal obtained by applying the prediction error filter of the corresponding frame to the ad-hoc signal of the corresponding frame, followed by outputting the inverse filter; and a control means that iteratively executes the inverse filter application means, the prediction error filter calculation means and the inverse filter calculation means until the iteration termination condition is met.

In order to solve the above problem, a signal distortion elimination method according to the present invention comprises: an inverse filter application step in which an inverse filter application means applies a filter (hereinafter referred to as an inverse filter) to an observed signal when a predetermined iteration termination condition is met, followed by outputting the results thereof as a restored signal, and when the iteration termination condition is not met, applies the inverse filter to the observed signal, followed by outputting the results thereof as an ad-hoc signal; a prediction error filter calculation step in which a prediction error filter calculation means segments the ad-hoc signal into frames, and outputs a prediction error filter of each of frames obtained by performing linear prediction analysis on the ad-hoc signal of each frame; an inverse filter calculation step in which an inverse filter calculation means calculates an inverse filter such that the samples of a concatenation of innovation estimates of the respective frames (hereinafter referred to as an innovation estimate sequence) become mutually independent, where the innovation estimate of a single frame (hereinafter referred to as an innovation estimate) is a signal obtained by applying the prediction error filter of the corresponding frame to the ad-hoc signal of the corresponding frame, followed by outputting the inverse filter; and a control step in which a control means iteratively executes the inverse filter application steps, the prediction error filter calculation steps and the inverse filter calculation steps until the iteration termination condition is met.

In addition, in the signal distortion elimination method described above, a pre-whitening process may be prepositioned and processing similar to those described above may be performed on a whitened signal obtained through pre-whitening. More specifically, the signal distortion elimination method may be comprised of: a whitening filter calculation step in a which whitening filter calculation means outputs a whitening filter obtained by performing linear prediction analysis on an observed signal; a whitening filter application step in which a whitening filter application means outputs a whitened signal by applying the whitening filter to the observed signal; an inverse filter application step wherein an inverse filter application means applies a filter (hereinafter referred to as an inverse filter) to the whitened signal when a predetermined iteration termination condition is met, followed by outputting the results thereof as a restored signal, and when the iteration termination condition is not met, applies the inverse filter to the whitened signal, followed by outputting the results thereof as an ad-hoc signal; a prediction error filter calculation step in which a prediction error filter calculation means segments the ad-hoc signal into frames, and outputs a prediction error filter of each of frames obtained by performing linear prediction analysis on the ad-hoc signal of each frame; an inverse filter calculation step in which an inverse filter calculation means calculates an inverse filter such that the samples of a concatenation of innovation estimates of the respective frames (hereinafter referred to as an innovation estimate sequence) become mutually independent, where the innovation estimate of a single frame (hereinafter referred to as an innovation estimate) is a signal obtained by applying the prediction error filter of the corresponding frame to the ad-hoc signal of the corresponding frame, followed by outputting the inverse filter; and a control step in which a control means iteratively executes the inverse filter application steps, the prediction error filter calculation steps and the inverse filter calculation steps until the iteration termination condition is met.

It is possible to make a computer operate as a signal distortion elimination apparatus by using a signal distortion elimination program which implements the present invention. In addition, by recording the signal distortion elimination program on a computer-readable recording medium, it is now possible to make another computer to function as a signal distortion elimination apparatus or to distribute the signal distortion elimination program.

Effects of the Invention

In the present invention, the contribution of the characteristics inherent in an original signal contained in an observed signal is reduced not by using a prediction error filter calculated from the observed signal but by using a prediction error filter calculated from an ad-hoc signal (a tentative restored signal) obtained by applying a (tentative) inverse filter to the observed signal. Since a prediction error filter calculated from an ad-hoc signal is insusceptible to transfer characteristics, it is possible to eliminate the characteristics inherent in the original signal in a more accurate manner. Such an inverse filter that makes samples of a signal (innovation estimate sequence), which is obtained by applying prediction error filters calculated with the present invention to an ad-hoc signal, mutually independent is capable of accurately eliminating transfer characteristics. Therefore, by applying such an inverse filter to an observed signal, a highly accurate restored signal from which distortion attributable to transfer characteristics has been reduced is obtained.

BEST MODES FOR CARRYING OUT THE INVENTION

§1 Principles of Present Invention

Figure 1:
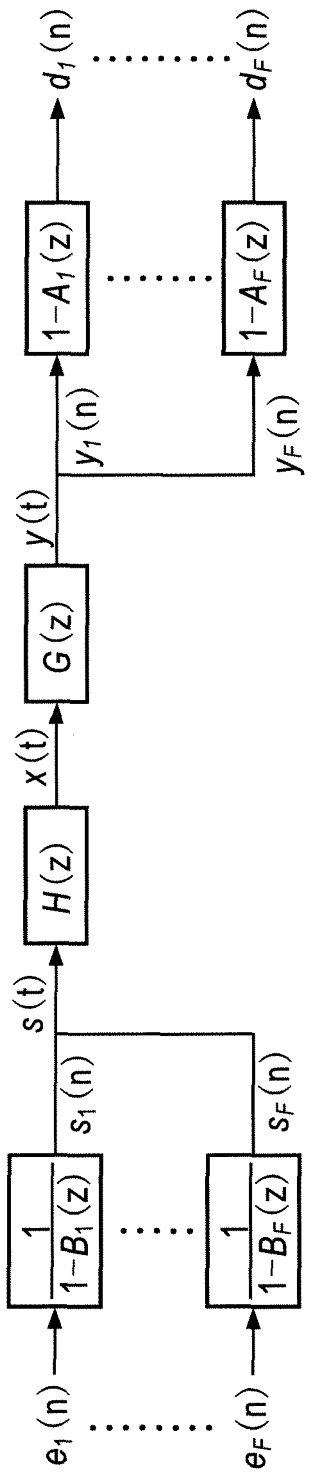
FIG. 1 is a block diagram representing a model mechanism for explaining principles of the present invention.

Prior to the description of embodiments, principles of the present invention will now be described.

In the following description, a single signal source is assumed unless otherwise noted.

1.1 Signal

Object signals of the present invention widely encompass such signals as human speech, music, biological signals, and electrical signals obtained by measuring a physical quantity of an object with a sensor. It is more desirable that an object signal is an autoregressive (AR) process or well approximately expressed as the autoregressive process. For instance, a speech signal is normally considered as a signal expressed by a piecewise stationary AR process, or an output signal of an AR system representing phonetic characteristics driven by an Independent and Identically Distributed (i.i.d.) signal (refer to Reference literature 1).

The principles of the present invention will now be described using a speech signal as a typical example of such a signal.

(Reference literature 1) L. R. Rabiner, R. W. Schafer, "Digital Processing of Speech Signals," Bell Laboratories, Incorporated, 1978.

1.2 Modeling of a Speech Signal

First, a speech signal s(t), which will be treated as an original signal, is modeled as a signal satisfying the following three conditions.

[Condition 1] The speech signal s(t) is generated by a piecewise stationary AR process.

From [Condition 1], let us denote the order of the AR process and the frame length considered to be stationary by P and W, respectively. Here, by segmenting the speech signal s(t) into frames, a speech signal $s_i(n)$ of an ith frame is described as Equation (1) provided below. Equation (2) represents a correspondence relation between a sample of an ith frame speech signal $s_i(n)$ and a sample of a speech signal s(t) before the segmentation. In other words, the nth sample of the ith frame corresponds to the (i−1)W+nth sample of the speech signal s(t) before the segmentation. In Equations (1) and (2), $b_i(k)$ represents a linear prediction coefficient and $e_i(n)$ represents an innovation, where $1 \leqq n \leqq W$, $1 \leqq t \leqq N$, and N is the total number of samples. In the following description, unless otherwise noted, parameter n denotes a sample number in a single frame while parameter t denotes a sample number of a signal over all the frames. Hereafter, the total number of frames will be denoted by F.

$$s_i(n) = \sum_{k=1}^{P} b_i(k)s_i(n-k) + e_i(n) \tag{1}$$

$$s_i(n) = s((i-1)W + n) \tag{2}$$

Similarly, as regards an nth innovation $e_i(n)$ of an ith frame, the nth innovation $e_i(n)$ of the ith frame is related to an innovation e(t) of the speech signal s(t) before the segmentation. In this case, the nth innovation $e_i(n)$ of the ith frame corresponds to the (i−1)W+nth innovation of the innovation e(t) before the segmentation, that is, $e_i(n)=e((i-1)W+n)$ holds.

Equation (1) is then z-transformed. By letting $S_i(Z)$ denote the z-transform of the left-hand side, $E_i(Z)$ denote the z-transform of the second term on the right-hand side, and $B_i(z)=\Sigma_{k=1}^{P} b_i(k)z^{-k}$, then the first term on the right-hand side is represented by $B_i(Z)S_i(Z)$. Therefore, the z-transform of Equation (1) is expressed as $(1-B_i(z))S_i(Z)=E_i(Z)$. Here, $z^{-1}$ corresponds to a 1 tap delay operator in the time domain. Hereafter, time domain signals (tap weights) will be denoted by small letters, while z domain signals (transfer functions) will be denoted by capital letters. $1-B_i(z)$ must satisfy the minimum phase property, and it is required that all the zeros of $1-B_i(z)$ should be within a unit circle on a complex plane.

[Condition 2] Innovations $e_i(\mathbf{1}), \ldots, e_i(W)$ belonging to the ith frame are independent and identical distributed. The mean and skewness (third order cumulant) of the probability distribution of the innovations $e_i(\mathbf{1}), \ldots, e_i(W)$ are 0, while the kurtosis (fourth order cumulant) thereof is positive. In addition, innovations $e_i(n)$ and $e_j(n')$, respectively belonging to the ith and jth frames [i≠j], are also mutually independent. However, these innovations do not necessarily belong to an identical distribution.

[Condition 3] The prediction error filter $1-B_i(z)$ does not have any zeros shared by other frames.

From Equations (1) and (2), the speech signal s(t) is expressed as Equation (3), where [•] denotes a flooring operator.

$$s(t) = \sum_{k=1}^{P} b_i(k)s(t-k) + e(t) \tag{3}$$

$$i = \left[\frac{t-1}{W} + 1\right]$$

Thus, [Condition 2] is equivalent to the assumption that innovations process e(t) is a temporally-independent signal, and its statistical properties (or statistics) are stationary within a frame. Moreover, [Condition 3] is equivalent to the assumption that the system specified by linear prediction coefficients $\{b_i(k)\}_{k=1}^{P}$ does not have a time-invariant pole.

1.3 Modeling of an Observed Signal

Next, an observed signal obtained by observing a speech signal with M microphones will be modeled. M is an integer satisfying M≧1.

A reverberant signal $x_m(t)$ observed by the mth (1≦m≦M) microphone is modeled as Equation (4), using tap weights $\{h_m(k);\ 0≦k≦K;$ K denotes the length of the impulse response$\}$ of the transfer function $H_m(z)$ of a signal transmission path from the sound source to the mth microphone. In the present description, reverberation is taken up as a typical example of transfer characteristics in the case of a speech signal, and the transfer characteristics will be replaced by the reverberation. Note, however, that this does not mean that the transfer characteristics are limited to the reverberation.

$$x_m(t) = \sum_{k=0}^{K} h_m(k)s(t-k) \tag{4}$$

The set of signals observed by all the M microphones is represented as Equation (5) where $x(t)=[x_1(t), \ldots, x_M(t)]^T$, and $h(k)=[h_1(k), \ldots, h_M(k)]^T$.

$$x(t) = \sum_{k=0}^{K} h(k)s(t-k) \tag{5}$$

1.4 Principle of Signal Distortion Elimination

A restored signal y(t) after signal distortion elimination is calculated by Equation (6) by using tap weights $\{g_m(k);$ 1≦m≦M; 0≦k≦L; where L denotes the order of the inverse filter$\}$ of a multichannel inverse filter $\{G_m(z);\ 1≦m≦M\}$. In the present invention, $g_m(k)$ that is an inverse filter coefficient is estimated only from the observed signals $x_1(t), \ldots, x_M(t)$.

$$y(t) = \sum_{m=1}^{M} \sum_{k=0}^{L} g_m(k)x_m(t-k) \tag{6}$$

1.5 Basic Principle of the Present Invention

The basic principle of the present invention is characterized primarily by jointly estimating inverse filters $\{G_m(z);\ 1≦m≦M\}$ of transfer functions $\{H_m(z);\ 1≦m≦M\}$ and prediction error filters $\{1-A_i(z);\ 1≦i≦F\}$ that are inverse filters of the AR filters $\{1/(1-B_i(z));\ 1≦i≦F\}$.

In order to describe this basic principle, a diagram of the entire system, in which the above-described model mechanism is embedded, is shown in FIG. 1. According to the above-described model, an original signal s(t) is regarded as the concatenation of signals $s_1(n), \ldots, s_F(n)$, each of which is obtained by applying an AR filter $1/(1-B_i(z))$ to a frame-wise innovation sequence $e_i(\mathbf{1}), \ldots, e_i(W)$, and an observed signal x(t) is obtained by convolving the original signal s(t) with the transfer function H(z). In addition, signal distortion elimination is described as a processing for obtaining a restored signal y(t) by applying the inverse filter G(z) to the observed signal x(t). Let us consider an innovation estimate, or $d_i(\mathbf{1}), \ldots, d_i(W)$, that is obtained by segmenting the restored signal y(t) into frames and then applying the ith frame prediction error filter $1-A_i(z)$ to the ith frame signal. Then, the innovation estimate is desirable to be equal to the innovation sequence $e_i(\mathbf{1}), \ldots, e_i(W)$. If an output signal $d_i(n)$ of the prediction error filter $1-A_i(z)$ satisfies $d_i(n)=e_i(n)$ (1≦i≦F, 1≦n≦W), then it can be shown that $$\sum_{m=1}^{M} H_m(z)G_m(z) = 1$$

under [Condition 3](for mathematical proof thereof, refer to Reference literature A). In other words, s(t)=y(t) holds. In this case, $1-A_i(z)$ is equal to $1-B_i(z)$.

(Reference literature A) Takuya Yoshioka, Takafumi Hikichi, Masato Miyoshi, Hiroshi G. Okuno: Robust Decomposition of Inverse Filter of Channel and Prediction Error Filter of Speech Signal for Dereverberation, Proceedings of the 14th European Signal Processing Conference (EUSIPCO 2006), CD-ROM Proceedings, Florence, 2006.

However, in reality, the innovation $e_i(n)$ ($1 \leqq i \leqq F$, $1 \leqq n \leqq W$) cannot be used as an input signal to a signal distortion elimination apparatus. Note that, in the system shown in FIG. 1, the series of processes for obtaining an observed signal x(t) from each innovation sequence $e_i(n)$ is a model process. Thus, in reality, it is either impossible or difficult to obtain the respective innovation sequences $e_i(n)$, the AR filter $1/(1-B_i(z))$, or the transfer function H(z). The only available information is the observed signal x(t). Accordingly, based on the above-described [Condition 2], the inverse filter $G_m(z)$ and each prediction error filter $1-A_i(z)$ are estimated such that the samples of an innovation estimate sequence over all the frames, obtained by concatenating every innovation estimate $d_i(\mathbf{1}), \ldots, d_i(W)$ of the ith frame, become mutually independent, or that the samples of the innovation estimate sequence, $d_1(\mathbf{1}), \ldots, d_1(W), \ldots, d_i(\mathbf{1}), \ldots, d_i(W), \ldots, d_F(\mathbf{1}), \ldots, d_F(W)$, become independent.

The idea of the present invention mentioned above can be distinguished from the conventional method in the following sense. The conventional method obtains an inverse filter as a solution of a problem that can be described as "apply a prediction error filter calculated based on an observed signal to the observed signal, and then calculate an inverse filter that maximizes the normalized kurtosis of the signal obtained by applying the inverse filter to the prediction-error-filtered signal". In contrast, the present invention obtains an inverse filter as a solution of a problem that can be described as "calculate an inverse filter such that a signal obtained by applying a prediction error filter, which is obtained based on a signal obtained by applying an inverse filter to an observed signal, to the inverse-filtered signal becomes independent among their samples". With this problem, it should be noted that, since the prediction error filter is calculated based on a signal obtained by applying an inverse filter to an observed signal, not only the inverse filter but also the prediction error filter is jointly calculated.

This problem may be formulated using the framework similar to ICA (Independent Component Analysis). While a description will now be given from the perspective of minimizing mutual information, maximum likelihood estimation-based formulation is also possible. In any case, the difference lies only in the formulation of the problem.

Using mutual information (Kullback-Leibler divergence) as a measure of independence, the problem to be solved is formulated as Equation (7), where $g=[g_1^T, \ldots, g_M^T]^T$, $g_m=[g_m(\mathbf{0}), \ldots, g_m(L)]^T$, $a=[a_1^T, \ldots, a_F^T]^T$, $a_i=[a_i(\mathbf{1}), \ldots, a_i(P)]^T$, and $a_i(k)$ denotes the prediction error filter coefficient. $I(U_1, \ldots, U_n)$ represents mutual information among random variables $U_i$. In addition, g and a with the symbol ^ denote optimal solutions to be obtained. Superscript T denotes transposition.

$$\{\hat{g}, \hat{a}\} = \underset{g,a}{\operatorname{argmin}}\, I(d_1(1), \ldots, d_1(W), \ldots, d_F(1), \ldots, d_F(W)) \tag{7}$$

Constraints

[1] $\|g\|=1$ (where $\|\bullet\|$ represents the norm operator.)

[2] $1-A_i(z)$ has all zeros within a unit circle on the complex plane ($1 \leqq i \leqq F$).

Mutual information I does not vary even when the amplitude of the innovation estimate sequence $d_1(\mathbf{1}), \ldots, d_1(W), \ldots, d_i(\mathbf{1}), \ldots, d_i(W), \ldots, d_F(\mathbf{1}), d_F(W)$ is multiplied by a constant. Constraint [1] of Equation (7) is a condition for eliminating this indefiniteness of amplitude. Constraint [2] of Equation (7) is a condition for restricting the prediction error filter to a minimum phase system in accordance with the above-described [Condition 1]. Hereafter, the mutual information I will be referred to as a loss function which takes an innovation estimate sequence as an input and outputs the mutual information among them.

1.6 Derivation of Loss Function

In order to perform optimization of Equation (7), the loss function I $(d_1(\mathbf{1}), \ldots, d_F(W))$ must be estimated from a finite-length signal sequence $\{d_i(n); 1 \leqq i \leqq F, 1 \leqq n \leqq W\}$. By letting D(U) denote a differential entropy of a (multivariate) random variable U, I $(d_1(\mathbf{1}), \ldots, d_F(W))$ is defined by Equation (8), where $d=[d_F^T, \ldots, d_1^T]^T$, $d_i=[d_i(W), \ldots, d_i(\mathbf{1})]^T$.

$$I(d_1(1), \ldots, d_F(W)) = \sum_{i=1}^{F}\sum_{n=1}^{W} D(d_i(n)) - D(d) \tag{8}$$

By using notations $y=[y_F^T, \ldots, y_1^T]^T$ and $y_i=[y_i(W), \ldots, y_i(\mathbf{1})]^T$, d is expressed using y as d=Ay, where the matrix A is expressed as Equations (9) and (10).

$$A = \begin{bmatrix} A_F & & \\ & \ddots & \\ & & A_1 \end{bmatrix} \tag{9}$$

$$A_i = \begin{bmatrix} 1 & -a_i(1) & \cdots & -a_i(P) & & & \\ & \ddots & \ddots & & \ddots & & \\ & & 1 & -a_i(1) & \cdots & -a_i(P) & \\ & & & \ddots & \ddots & & \\ & & & & \ddots & -a_i(1) & \\ & & & & & 1 & \end{bmatrix} \tag{10}$$

Thus, D(d) is expressed as Equation (11).

$$D(d)=D(y)+\log \det A \tag{11}$$

By expressing the covariance matrix of multivariate random variable U as Σ(U), since $\Sigma(d)=E\{dd^T\}=AE\{yy^T\}A^T=A\Sigma(y)A^T$ holds for the second term in the right-hand side of Equation (11), we have Equation (12).

$$\log\det A = \frac{1}{2}(\log\det\Sigma(d) - \log\det\Sigma(y)) \tag{12}$$

Substituting Equations (11) and (12) into Equation (8) yields Equation (13), where $\sigma(U)^2$ represents the variance of random variable U.

$$I(d_1(1), \ldots, d_1(W), \ldots, d_F(1), \ldots, d_F(W)) = \sum_{i=1}^{F}\sum_{n=1}^{W} D(d_i(n)) - \frac{1}{2}\log\det\Sigma(d) + \left(\frac{1}{2}\log\det\Sigma(y) - D(y)\right)$$
$$= -\sum_{i=1}^{F}\sum_{n=1}^{W}\left(\frac{1}{2}\log\sigma(d_i(n))^2 - D(d_i(n))\right) + \frac{1}{2}\left(\sum_{i=1}^{F}\sum_{n=1}^{W}\log\sigma(d_i(n))^2 - \log\det\Sigma(d)\right) + \left(\frac{1}{2}\log\det\Sigma(y) - D(y)\right)$$
$$= -\sum_{i=1}^{F}\sum_{n=1}^{W} J(d_i(n)) + C(d_1(1), \ldots, d_F(W)) + J(y) \quad (13)$$

In Equation (13), J(U) denotes the negentropy of (mutlivariate) random variable U. The negentropy takes a nonnegative value indicating the degree of nongaussianity of U, and takes 0 only when U follows a gaussian distribution. $C(U_1, \ldots, U_n)$ is defined as Equation (14). $C(U_1, \ldots, U_n)$ takes a nonnegative value indicating the degree of correlation among random variables $U_i$, and takes 0 only when the random variables $U_i$ are uncorrelated.

$$C(U_1, \ldots, U_n) = \frac{1}{2}\left(\sum_{i=1}^{n}\log\sigma(U_i)^2 - \log\det\Sigma([U_1, \ldots, U_n]^T)\right) \quad (14)$$

Here, by using notations $s=[s_F^T, \ldots, s_1^T]^T$ and $s_i=[s_i(W), \ldots, s_i(\mathbf{1})]^T$, since J(y)=J(s)=constant (proof omitted), Equation (13) is further simplified to Equation (15).

$$I(d_1(1), \ldots, d_F(W)) = -\sum_{i=1}^{F}\sum_{n=1}^{W} J(d_i(n)) + C(d_1(1), \ldots, d_F(W)) + const \quad (15)$$

Therefore, it is shown that the optimization problem formulated as Equation (7) is equivalent to solving the optimization problem of Equation (16).

$$\{\hat{g}, \hat{a}\} = \underset{g,a}{\operatorname{argmin}}\left(-\sum_{i=1}^{F}\sum_{n=1}^{W} J(d_i(n)) + C(d_1(1), \ldots, d_F(W))\right) \quad (16)$$

Constraints

[1] ||g||=1 (where ||•|| represents the norm operator.)

[2] $1-A_i(z)$ has all zeros within a unit circle on the complex plane (1≦i≦F).

1.7 Optimization by Altering Variables Method

With respect to Equation (16), g and a are optimized by employing an altering variables method. In other words, by respectively denoting the estimates of g and a at the rth iteration as $g^{\hat{}(r)}$ and $a^{\hat{}(r)}$, the updated estimates $g^{\hat{}(r+1)}$ and $a^{\hat{}(r+1)}$ are obtained by executing the optimization of Equation (17) and then the optimization of Equation (18). In the notation of g^ and a^, the symbol ^ is affixed above g and a, respectively. For instance, if the upper limit of the iteration counts is set to $R_1$, $g^{\hat{}(R1+1)}$ and $a^{\hat{}(R1+1)}$ which are obtained at the $R_1$th iteration will be the optimal solutions of Equation (16). The superscript R1 is $R_1$.

$$\hat{a}^{(r+1)} = \underset{a}{\operatorname{argmin}}\left(-\sum_{i=1}^{F}\sum_{n=1}^{W} J(d_i(n)) + C(d_1(1), \ldots, d_F(W))\right) \quad (17)$$

Constraints

[1] $g=g^{\hat{}(r)}$

[2] $1-A_i(z)$ has all zeros within a unit circle on the complex plane (1≦i≦F).

$$\hat{g}^{(r+1)} = \underset{g}{\operatorname{argmin}}\left(-\sum_{i=1}^{F}\sum_{n=1}^{W} J(d_i(n)) + C(d_1(1), \ldots, d_F(W))\right) \quad (18)$$

Constraints

[1] $a=a^{\hat{}(r+1)}$

[2] ||g||=1

The intention of Equation (17) is to estimate, based on the present estimate of the inverse filter for cancelling the transfer characteristics, a prediction error filter for cancelling the characteristics inherent in the original signal. On the other hand, the intention of Equation (18) is to estimate an inverse filter based on the present estimate of the prediction error filter. By iterating these two types of optimization so that the degree of the mutual independence among the samples of the innovation estimate sequence, $d_1(\mathbf{1}), \ldots, d_1(W), \ldots, d_i(\mathbf{1}), \ldots, d_i(W), \ldots, d_F(\mathbf{1}), \ldots, d_F(W)$, is increased, it is now possible to jointly estimate an inverse filter and a prediction error filter. Therefore, iterations performed here are important for highly accurate inverse filter estimation. However, as can be seen from FIG. 8, the longer the observed signal to be processed, a certain level of distortion elimination is achieved even for a single iteration. Therefore, with the present invention, the number of iterations may be one.

1.8 Optimization of a

In the present invention, optimization of Equation (17) will be performed as follows.

First, it should be noted that while $C(d_1(\mathbf{1}), \ldots, d_F(W))$ relates to second order statistics of $d_i(n)$, $J(d_i(n))$ is a value related to higher order statistics of $d_i(n)$. While second order statistics provide only the amplitude information of a signal, higher order statistics provide the phase information additionally. Therefore, in general, it is possible that optimization including higher order statistics will derive a nonminimum phase system. Therefore, considering the constraint that $1-A_i(z)$ be a minimum phase system, a is optimized by solving the optimization problem of Equation (19).

$$\hat{a}^{(r+1)} = \underset{a}{\operatorname{argmin}} C(d_1(1), \ldots, d_F(W)) \tag{19}$$

Constraints

[1] $g=g^{\wedge(r)}$

[2] $1-A_i(z)$ has all zeros within a unit circle on the complex plane ($1 \leqq i \leqq F$).

$C(d_1(\mathbf{1}), \ldots, d_F(W))$ is given by Equation (20).

$$C(d_1(1), \ldots, d_F(W)) = \frac{1}{2}\left(\sum_{i=1}^{F}\sum_{n=1}^{W}\log\sigma(d_i(n))^2 - \log\det\Sigma(d)\right) \tag{20}$$

Here, since matrix A is an upper triangular matrix whose diagonal components are all 1 as represented by Equations (9) and (10), we have log det A=0. By Substituting Equation (20) into Equation (12) yields the relationship expressed as Equation (21).

$$\log det\Sigma(d)=\log det\Sigma(y)=\text{constant} \tag{21}$$

Thus, Equation (19) is equivalent to the optimization problem of Equation (22). Equation (22) means "calculate a that minimizes the sum of the log variances of innovation estimates $d_i(\mathbf{1}), \ldots, d_i(W)$ of each ith frame over all the frames".

$$\hat{a}^{(r+1)} = \underset{a}{\operatorname{argmin}} \sum_{i=1}^{F}\sum_{n=1}^{W}\log\sigma(d_i(n))^2 \tag{22}$$

Constraints

[1] $g=g^{\wedge(r)}$

[2] $1-A_i(z)$ has all zeros within a unit circle on the complex plane ($1 \leqq i \leqq F$).

Solving the optimization problem expressed as Equation (22) is equivalent to performing linear prediction analysis on the ad-hoc signal of each frame, which is obtained by applying the inverse filter given by $g^{\wedge(r)}$ to the observed signal. The linear prediction analysis gives minimum phase prediction error filters. Refer to above-described Reference literature 1 for the linear prediction analysis.

Incidentally, according to Equation (22), $a^{\wedge(r+1)}$ is calculated as a that minimizes the sum of log variances of innovation estimates $d_i(\mathbf{1}), \ldots, d_i(W)$ of each ith frame over all the frames. However, this does not mean that the present invention is limited to this method. Although a base of the logarithmic function is not specified in each equation provided above, the accepted practice is to set the base to 10 or the Napier's constant. At any rate, the base is greater than 1. In this case, since the logarithmic function monotonically increases, a that minimizes the sum of variances of innovation estimates $d_i(\mathbf{1}), \ldots, d_i(W)$ of each ith frame over all the frames is used as a^(r+1).

1.9 Optimization of g

In the present invention, optimization of Equation (18) will be performed as follows.

As described above, $C(d_1(\mathbf{1}), \ldots, d_F(W))$ is a measure related to the degree of the correlation of $\{d_i(n);\ (1 \leqq i \leqq F, 1 \leqq n \leqq W)\}$. Since the minimization of $C(d_1(\mathbf{1}), \ldots, d_F(W))$ is performed during the (r+1)th optimization of a, $C(d_i(\mathbf{1}), \ldots, d_F(W))$ is negligible compared to $\Sigma_{i=1}^{F}\Sigma_{n=1}^{W}J(d_i(n))$. Accordingly, in optimizing g, the optimization problem of Equation (23) will be solved.

$$\hat{g}^{(r+1)} = \underset{g}{\operatorname{argmin}}\left(-\sum_{i=1}^{F}\sum_{n=1}^{W}J(d_i(n))\right) \tag{23}$$

Constraints

[1] $a=a^{\wedge(r+1)}$

[2] $\|g\|=1$

Based on [Condition 2], $J(d_i(n))$ is approximated by using Formula (24). Refer to Reference literature 2 for details thereof. For random variable U, $\kappa_4(U)$ denotes the kurtosis (fourth order cumulant) of U. The right-hand side of Formula (24) is referred to as a normalized kurtosis of the ith frame.

(Reference literature 2) A. Hyvarinen, J. Karhunen, E. Oja, "INDEPENDENT COMPONENT ANALYSIS", John Wiley & Sons, Inc. 2001.

$$J(d_i(n)) \approx \frac{\kappa_4(d_i(n))^2}{\sigma(d_i(n))^8} \tag{24}$$

Since the kurtosis of the innovation of a speech signal is positive from [Condition 2], $\kappa_4(d_i(n))/\sigma(d_i(n))^4$ is positive. Therefore, the optimization problem of Equation (23) reduces to the optimization problem of Equation (25). Based on the frame-wise stationarity of speech signals described in [Condition 1], $\sigma(d_i(n))$ and $\kappa_4(d_i(n))$ are calculated from the samples of each frame. While 1/W has been affixed in Equation (26), this term is only for the convenience of subsequent calculations and does not affect the calculation of the optimal solution of g by Equation (25). From Equations (25) and (26), $g^{\wedge(r+1)}$ is obtained as g that maximizes the sum of the normalized kurtosis values over all the frames. Equations (25) and (26) mean "calculate g that maximizes the sum of the normalized kurtosis values of each frame over all the frames".

$$\hat{g}^{(r+1)} = \underset{g}{\arg\max}\, Q \tag{25}$$

$$Q = \frac{1}{W}\sum_{i=1}^{F}\sum_{n=1}^{W}\frac{\kappa_4(d_i(n))}{\sigma(d_i(n))^4} \tag{26}$$

Constraints

[1] $a=a^{\wedge(r+1)}$

[2] $\|g\|=1$

The optimal solution of g for Equation (25) is given as the solution for the equation where the differentiation of Q with respect to g is 0. This solution can be generally calculated according to the update rule expressed as Formula (27). The reason g' is divided by its norm is to impose the above-described constraint [2]. $\eta(u)$ denotes a learning rate. u denotes the update count during optimization of g.

$$g' \leftarrow g^{\langle u\rangle} + \eta(u)\cdot\nabla Q_{g=g^{\langle u\rangle}} \tag{27}$$

$$g^{\langle u+1\rangle} \leftarrow \frac{g'}{\|g'\|}$$

In Formula (27), $\nabla Q_g$ is given by Equations (28) and (29).

$$\nabla Q_g = \left[\frac{\partial Q}{\partial g_1(0)}, \cdots, \frac{\partial Q}{\partial g_1(L)}, \cdots, \frac{\partial Q}{\partial g_M(0)}, \cdots, \frac{\partial Q}{\partial g_M(L)}\right] \tag{28}$$

$$\frac{\partial Q}{\partial g_m(k)} = \sum_{i=1}^{F} \frac{4R}{E\{d_i(n)^2\}^4}$$

$$R = E\{d_i(n)^3 v_{mi}(n-k)\}E\{d_i(n)^2\}^2 - E\{d_i(n)^4\}E\{d_i(n)^2\}E\{d_i(n)v_{mi}(n-k)\} \tag{29}$$

In Equation (29), $d_i(n)$ is given by Equation (30), while $v_{mi}(n)$ is given by Equations (31) and (32). $x_{mi}(n)$ represents a signal of an ith frame observed by the mth microphone.

$$d_i(n) = y_i(n) - \sum_{k=1}^{P} a_i(k) y_i(n-k) \tag{30}$$

$$v_{mi}(n) = x_{mi}(n) - \sum_{k=1}^{P} a_i(k) x_{mi}(n-k) \tag{31}$$

$$x_{mi}(n) = x_m((i-1)W + n) \tag{32}$$

§2 Signal Distortion Elimination Based on Second Order Statistics

The conventional signal distortion elimination method described in the background art requires a relatively long observed signal (for instance, approximately 20 seconds). This is generally due to the fact that calculating higher order statistics such as the normalized kurtosis requires a significant amount of samples of an observed signal. However, in reality, such long observed signals are sometimes unavailable. Therefore, the conventional signal distortion elimination method is applicable only to limited situation.

In addition, because the calculation of the higher order statistics is relatively complicated, an apparatus configuration under the conventional signal distortion elimination method is likely to be complicated.

Thus, a principle of signal distortion elimination that is effective even for a shorter observed signal (for instance, of 3 to 5 seconds) and that involves simpler calculation than the conventional method will now be described. This principle uses only second order statistics of a signal, and is derived from the basic principle of the present invention which has been described in §1.

2.1 Principle of Signal Distortion Elimination Based on Second Order Statistics

Signal distortion elimination based on second order statistics assumes the following two conditions in addition to the three conditions described earlier.

[Condition 4] $M \geqq 2$. In other words, multiple microphones are used.

[Condition 5] $H_m = \{h_m(k)\}_{k=0}^{K}$ does not have any common zeros among different microphones.

In the optimization problem of Equation (16) provided above, g and a are calculated which minimize a measure comprising of negentropy J that is related to higher order statistics and a measure C indicating the degree of correlation among random variables.

The degree of correlation among random variables, C, is defined by second order statistics. Accordingly, the optimization problem to be solved is formulated by Equation (33).

$$\begin{aligned}\{\hat{g}, \hat{a}\} &= \underset{g,a}{\arg\min}\, C(d_1(1), \cdots, d_F(W)) \\ &= \underset{g,a}{\arg\min}\left(\sum_{i=1}^{F}\sum_{n=1}^{W} \log\sigma(d_i(n))^2 - \log det \sum(d)\right)\end{aligned} \tag{33}$$

By using Equation (21), the optimization problem of Equation (33) is transformed to the optimization problem of Equation (34). Equation (34) means "calculate the set of g and a that minimizes the sum of the log variances of innovation estimates $d_i(1), \ldots, d_i(W)$ of each ith frame over all the frames".

$$\{\hat{g}, \hat{a}\} = \underset{g,a}{\arg\min}\left(\sum_{i=1}^{F}\sum_{n=1}^{W} \log\sigma(d_i(n))^2\right) \tag{34}$$

Here, when the above-described [Condition 4] and [Condition 5] hold, a multichannel observed signal can be regarded as an AR process driven by an original signal from a sound source (refer to Reference literature 3). This means that the leading tap of an inverse filter G may be fixed as expression (35), where a microphone corresponding to m=1 is the microphone nearest to the sound source.

(Reference literature 3) K. Aded-Meraim, E. Moulines, and P. Loubaton. Prediction error method for second-order blind identification. IEEE Trans. Signal Processing, Vol. 45, No. 3, pp. 694-705, 1997.

$$g_m(0) = \begin{cases} 1 & m = 1 \\ 0 & m = 2, \cdots, M \end{cases} \tag{35}$$

A restored signal y(t), in which the transfer characteristics is eliminated, is obtained by applying the inverse filter G, whose coefficients g are defined by Equations (34) and (35), to the observed signal x(t) according to Equation (6).

2.2 Optimization of a

As to Equation (34), g and a are optimized by employing an altering variables method.

For fixed inverse filter coefficients $g_m(k)$, the loss function of Equation (34) is minimized with respect to the prediction error filter coefficients $a_i(k)$.

Note here the following two points. The first point is that since $g=[g_1^T, \ldots, g_M^T]^T$ is fixed, the restored signal y(t) that is an output of the inverse filter G is invariable during the optimization of the prediction error filter. The second point is that the ith frame prediction error filter coefficients $a_i(\mathbf{1}), \ldots, a_i(P)$ contribute only to $d_i(\mathbf{1}), \ldots, d_i(W)$.

Therefore, the prediction error filter coefficients $a_i(\mathbf{1}), \ldots, a_i(P)$ of each frame should be estimated so as to minimize $\Sigma_{n=1}^{W} \log \sigma(d_i(n))^2$. From [Condition 2], the variance of innovation estimate $d_i(\mathbf{1}), \ldots, d_i(W)$ of the ith frame is stationary within a frame. Thus, the minimization of $\Sigma_{n=1}^{W} \log \sigma(d_i(n))^2$ is equivalent to the minimization of $W^* \sigma((d_i(n))^2$, where the symbol * denotes multiplication. The variance $\sigma(d_i(n))^2$ is calculated as $\langle d_i(n)^2 \rangle_{n=1}^{W}$, where $\langle d_i(n)^2 \rangle_{n=1}^{W}$ represents the mean squares of $d_i(n)$ calculated using the innovation estimate, $d_i(\mathbf{1}), \ldots, d_i(W)$, within a single frame. Therefore, coefficients $a_i(k)$ that minimize $W^* \langle d_i(n)^2 \rangle_{n=1}^{W}$ or, in other words, that minimize the sum of squared $d_i(n)$ is estimated. Such coefficients $a_i(k)$ are calculated by using linear prediction analysis methodology.

Incidentally, according to the above description, $\hat{a}^{(r+1)}$ is calculated as a that minimizes the sum of log variances of innovation estimates $d_i(1), \ldots, d_i(W)$ of each ith frame over all the frames. However, this does not mean that the present invention is limited to this method. As described earlier, a that minimizes the sum of variances of innovation estimates $d_i(1), \ldots, d_i(W)$ of each ith frame over all the frames may be used as $\hat{a}^{(r+1)}$.

2.3 Optimization of g

For fixed prediction error filter coefficients $a_i(k)$, the loss function of Equation (34) is minimized with respect to the inverse filter coefficients $g_m(k)$.

A gradient descent method is used for the minimization of the loss function with respect to the inverse filter coefficients $g_m(k)$. Using [Condition 2], the optimization problem of Equation (34) is transformed to the optimization problem of Equation (36).

$$\hat{g} = \arg\min_{g}\left(\sum_{i=1}^{F} \log\left(\langle d_i(n)^2 \rangle_{n=1}^{W}\right)\right) \quad (36)$$

The optimal solution of g for Equation (36) is given as the solution for the equation where the differentiation of $\Sigma_{i=1}^{F} \log\langle d_i(n)^2\rangle_{n=1}^{W}$ with respect to g is 0. This solution is generally calculated according to the update rule expressed as Equation (37), where δ denotes a learning rate and $1 \leqq m \leqq M$, $1 \leqq k \leqq L$. Note that, in Equation (37), because of the conditions of Equation (35), the constraint of $\|g\|=1$ is not imposed. Moreover, because of the condition of Equation (35), k takes the value of $1 \leqq k \leqq L$.

$$g_m(k)' = g_m(k) + \delta \sum_{i=1}^{F} \frac{\langle d_i(n) v_{mi}(n-k) \rangle_{n=1}^{W}}{\langle d_i(n)^2 \rangle_{n=1}^{W}} \quad (37)$$

$$v_{mi}(n) = x_{mi}(n) - \sum_{k=1}^{P} a_i(k) x_{mi}(n-k) \quad (38)$$

By comparing Equation (37) with above-described Equation (29) or Equation (3) provided in the above-described Non-patent literature 1, it is clear that the second term of the right-hand side of Equation (37) is expressed by second order statistics, and the present calculation does not involve the calculation of higher order statistics. Therefore, the present method is also effective in the case of such short observed signals that estimating their high order statistics is difficult. Moreover, the calculation itself is simple.

Incidentally, according to Equation (36), $\hat{g}$ is calculated as g that minimizes the sum of log variances of innovation estimates $d_i(1), \ldots, d_i(W)$ of each ith frame over all the frames. However, this does not mean that the present invention is limited to this method. Although a base of a logarithmic function is not specified in each equation provided above, the accepted practice is to set the base to 10 or the Napier's constant. At any rate, the base is greater than 1. In this case, since the logarithmic function monotonically increases, g that minimizes the sum of variances of innovation estimates $d_i(1), \ldots, d_i(W)$ of each ith frame over all the frames may be used as $\hat{g}$. In this case, the update rule expressed as Equation (37) is no longer applicable, and it is necessary to calculate a solution for the equation where the differentiation of $\Sigma_{i=1}^{F} \langle d_i(n)^2\rangle_{n=1}^{W}$ with respect to g is 0. The resultant update rule may be formulated using the framework similar to ICA, and will be hereby omitted.

§3 Pre-whitening

Pre-whitening may be applied to the signal distortion elimination based on the present invention. By pre-whitening observed signals, stabilization of optimization procedures, particularly fast convergence of filter coefficient estimates, may be realized.

Coefficients $\{f_m(k); 0 \leqq k \leqq X\}$ of a filter (a whitening filter) that whitens an entire observed signal sequence $\{x_m(t); 1 \leqq t \leqq N\}$ obtained by each microphone are calculated by Xth order linear prediction analysis.

Based on Equation (39), the above-mentioned whitening filter is applied to the observed signal $x_m(t)$ obtained by each microphone. $w_m(t)$ represents the signal resulted from the whitening of the mth-microphone observed signal $x_m(t)$.

$$w_m(t) = \sum_{k=0}^{X} f_m(k) x_m(t-k) \quad (39)$$

In this case, Equations (31) and (38) should be changed to Equation (40), and Equation (32) to Equation (41).

$$v_{mi}(n) = w_{mi}(n) - \sum_{k=1}^{P} a_i(k) w_{mi}(n-k) \quad (40)$$

$$w_{mi}(n) = w_m((i-1)W + n) \quad (41)$$

§4 Embodiments

Embodiments of the present invention will now be described with reference to the drawings. However, the embodiments of the present invention are not limited to the respective embodiments described hereafter, and any embodiments implementing the principles described in the respective sections shall suffice.

<First Embodiment>

When implementing the first embodiment of the present invention, signals observed by sensors are processed according to the following procedure. In the present description, for the purpose of specifically describing the embodiments, a speech signal will be used as an example.

Before describing the first embodiment, an overview on obtaining observed signals and the way of segmenting the signals will be provided.

((Observed Signals))

An analog signal (this analog signal is convolved with distortion attributable to transfer characteristics) obtained by a sensor (microphone, for example), not shown in the drawings, is sampled at a sampling rate of, for instance, 8,000 Hz, and converted into a quantized discrete signal. Hereafter, this discrete signal will be referred to as an observed signal. Since components (means) necessary to execute the A/D conversion from an analog signal to an observed signal and so on are all realized by usual practices in known arts, descriptions and illustrations thereof will be omitted.

((Segmentation Processing))

Signal segmentation means, not shown in the drawings, excerpts discrete signals of a predetermined temporal length as a signal from the whole discrete signal while shifting a frame origin at regular time intervals in the direction of the temporal axis. For instance, discrete signals each having 200 sample point length (8,000 Hz×25 ms) are excerpted while shifting the origin every 80 sample points (8,000 Hz×10 ms). The excerpted signals are multiplied by a known window function, such as the Hamming window, Gaussian window, rectangular window. The segmentation by applying a window function is achievable using known usual practices.

An exemplary hardware configuration will be described when signal distortion elimination apparatus (1), which is the first embodiment of the present invention, is realized by using a computer (general-purpose machine).

Figure 2:
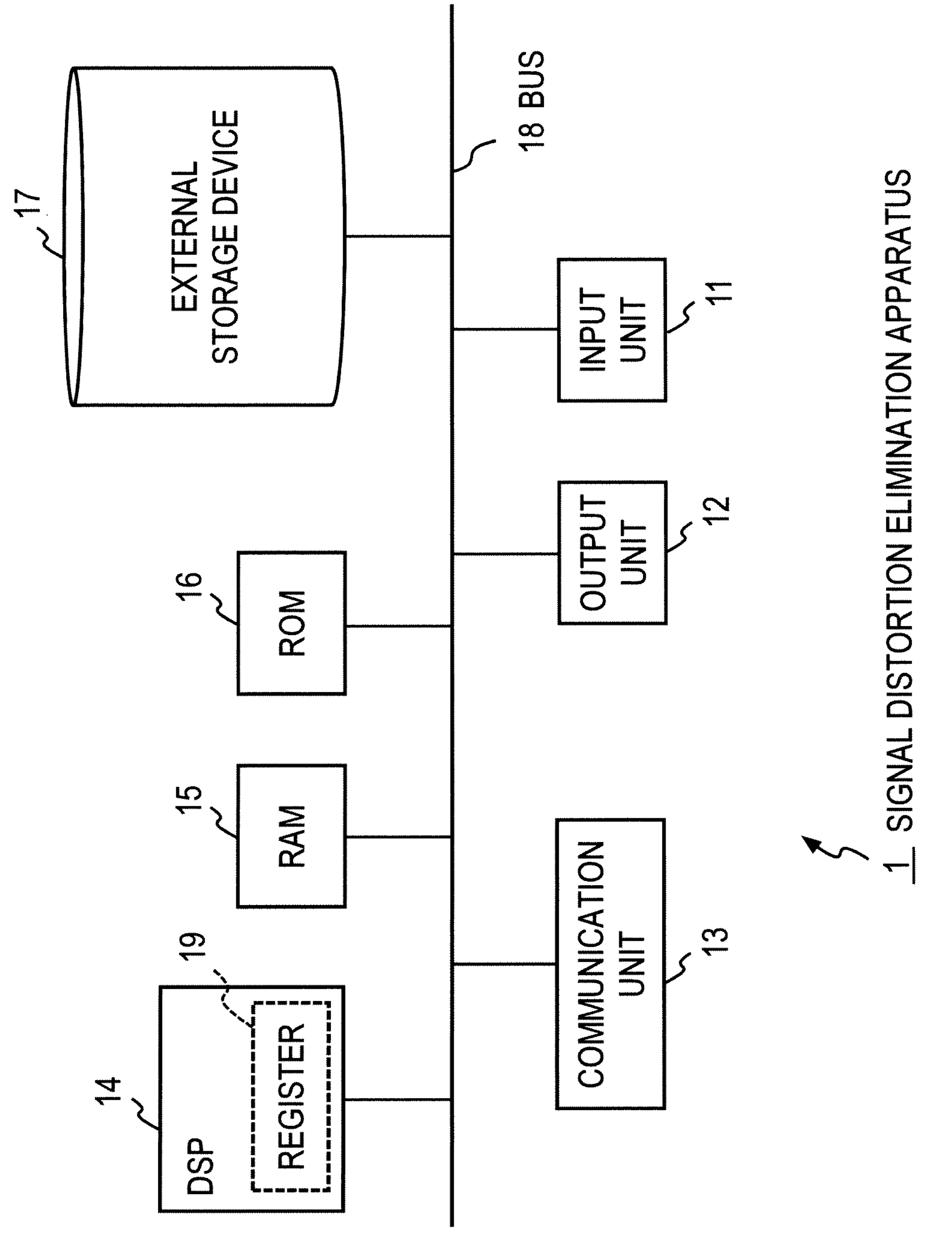
FIG. 2 is a diagram showing a hardware configuration example of a signal distortion elimination apparatus (1) according to a first embodiment.

As exemplified in FIG. 2, the signal distortion elimination apparatus (1) comprises: an input unit (11) to which a keyboard, a pointing device or the like is connectable; an output unit (12) to which a liquid crystal display, a CRT (Cathode Ray Tube) display or the like is connectable; a communication unit (13) to which a communication apparatus (such as a communication cable, a LAN card, a router, a modem or the like) capable of communicating with the outside of the signal distortion elimination apparatus (1) is connectable; a DSP (Digital Signal Processor) (14) (which may be a CPU (Central Processing Unit) or which may be provided with a cache memory, a register (19) or the like); a RAM (15) which is a memory; a ROM (16); an external storage device (17) such as a hard disk, an optical disk, a semiconductor memory; and a bus (18) which connects the input unit (11), the output unit (12), the communication unit (13), the DSP (14), the RAM (15), the ROM (16) and the external storage device (17) to make data available to those units. In addition, if needed, the signal distortion elimination apparatus (1) may be provided with an apparatus (drive) or the like that is capable of reading from or writing onto a recording medium such as a CD-ROM (Compact Disc Read Only Memory), a DVD (Digital Versatile Disc) and so on.

Programs for signal distortion elimination and data (observed signals) that are necessary to execute the programs are stored in the external storage device (17) of the signal distortion elimination apparatus (1) (instead of an external storage device, for instance, the programs may be stored in a ROM that is a read-only storage device). Data and the like obtained by executing of these programs are arbitrarily stored in the RAM, the external storage device or the like. Those data are read in from the RAM, the external storage device or the like when another program requires them.

More specifically, the external storage device (17) (or the ROM or the like) of the signal distortion elimination apparatus (1) stores: a program that applies an inverse filter to an observed signal; a program that obtains a prediction error filter from a signal obtained by applying the inverse filter to the observed signal; a program that obtains the inverse filter from the prediction error filter; and data (frame-wise observed signals and so on) that will become necessary to these programs. In addition, a control program for controlling processing based on these programs will also be stored.

In the signal distortion elimination apparatus (1) according to the first embodiment, the respective programs and data necessary to execute the respective programs which are stored in the external storage device (17) (or the ROM or the like) are read into the RAM (15) when required, and then interpreted, executed and processed by the DSP (14). As a result, as long as the DSP (14) realizes predetermined functions (the inverse filter application unit, the prediction error filter calculation unit, the inverse filter calculation unit, the control unit), the signal distortion elimination is achieved.

Figure 3:
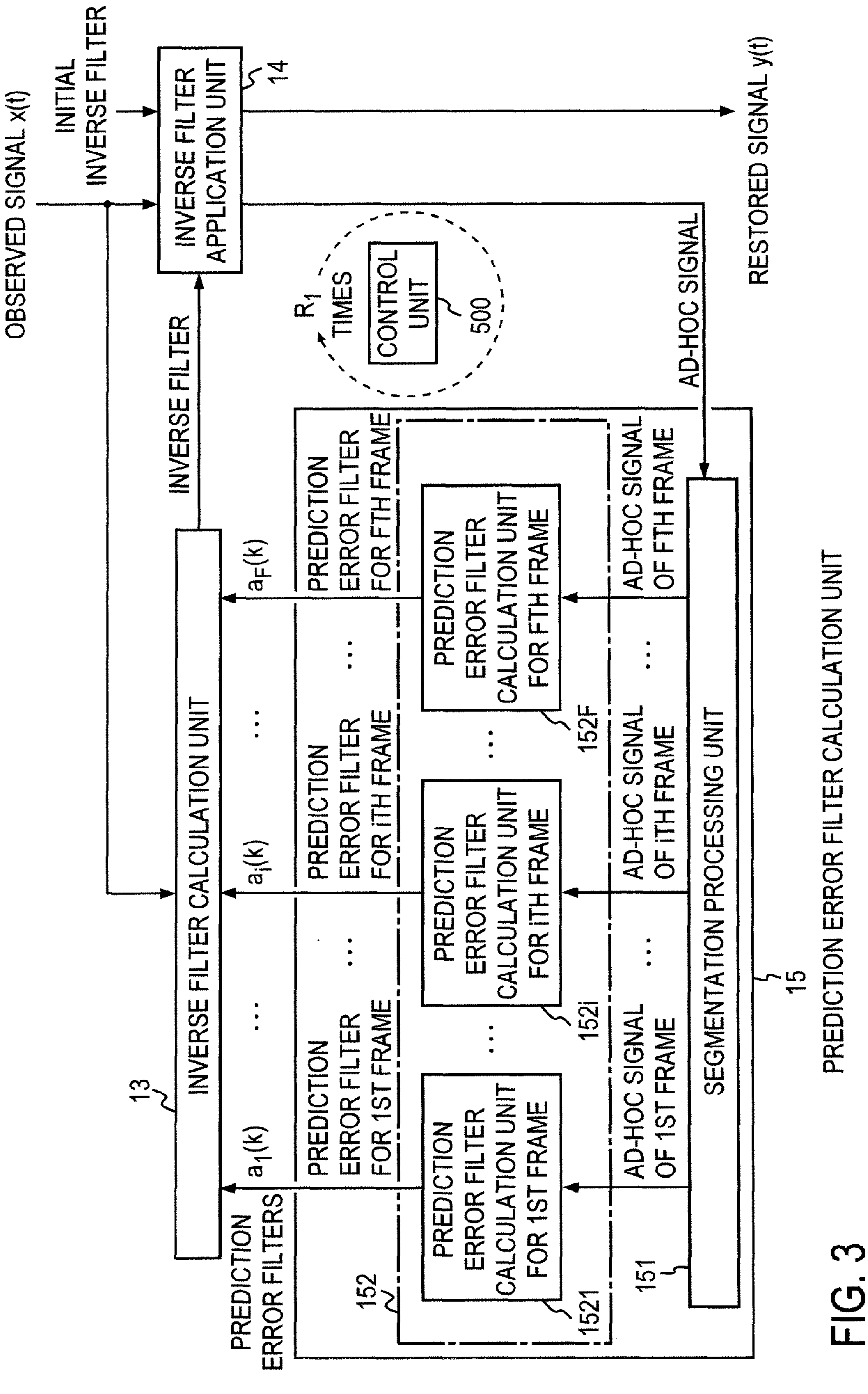
FIG. 3 is a functional block diagram showing a functional configuration example of the signal distortion elimination apparatus (1) according to the first embodiment.
Figure 4:
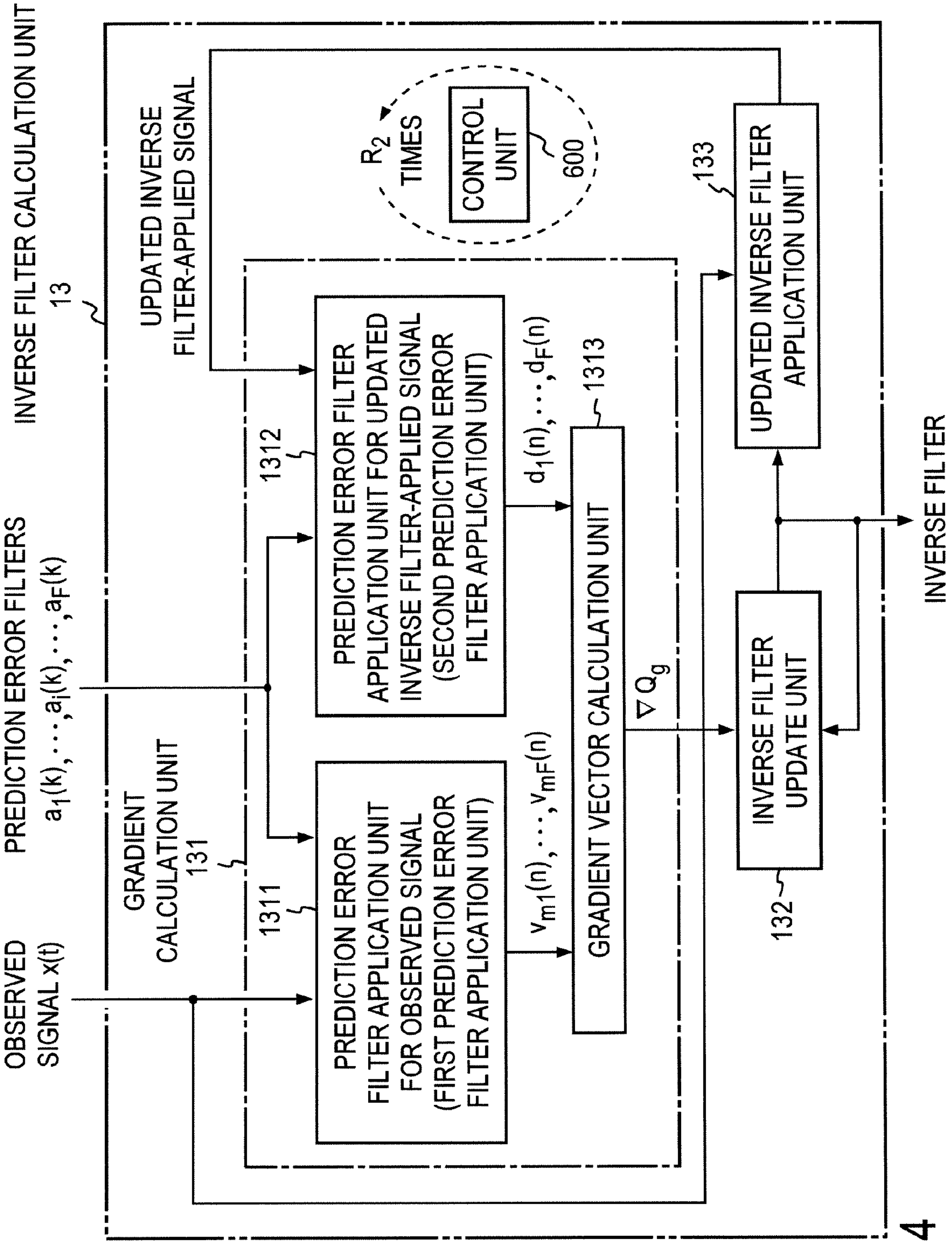
FIG. 4 is a functional block diagram showing a functional configuration example of an inverse filter calculation unit (13) of the signal distortion elimination apparatus (1)
Figure 5:
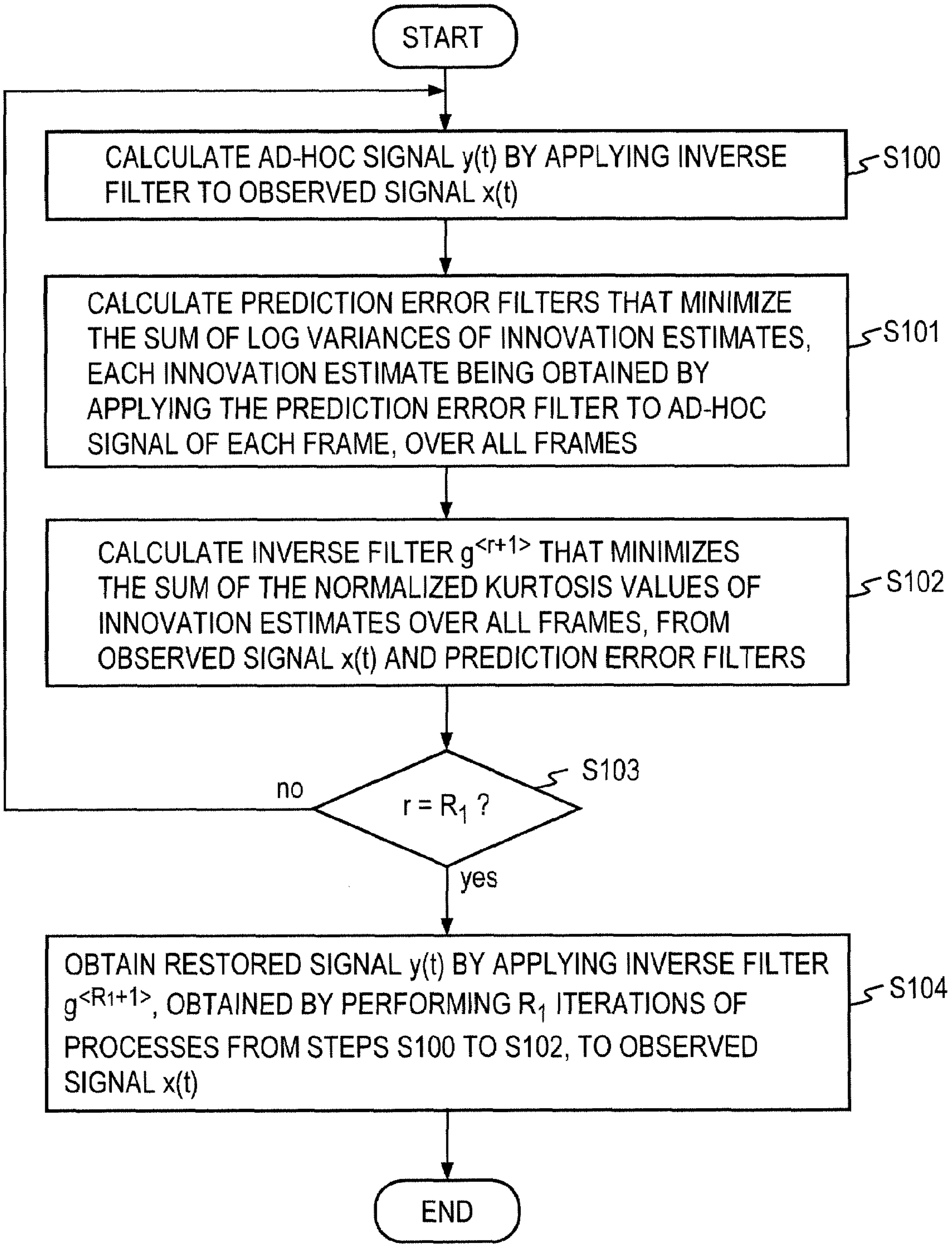
FIG. 5 is a process flow diagram showing a flow of signal distortion elimination processing according to the first embodiment.

Next, with reference to FIGS. 3 to 5, a signal distortion elimination processing flow of the signal distortion elimination apparatus (1) will be described in sequence.

A rough sketch of the processing procedure is: (a) a signal (hereafter referred to as an ad-hoc signal) resulting from applying an inverse filter to an observed signal x(t) is calculated; (b) a prediction error filter is calculated from the ad-hoc signal; (c) the inverse filter is calculated from this prediction error filter; (d) an optimum inverse filter is calculated by iterating the processes of (a), (b) and (c); and (e) a signal resulting from applying the optimized inverse filter to the observed signal is obtained as a restored signal y(t).

(b) corresponds to the above-described optimization of a, (c) corresponds to the above-described optimization of g, and (d) corresponds to Equations (17) and (18). The number of iterations in (d) is set to a predetermined number $R_1$. In other words, $1 \leqq r \leqq R_1$. In addition, the number of updates using the update rule for optimizing g in the process of (c) is set to a predetermined number $R_2$. In other words, $1 \leqq u \leqq R_2$. For every single iteration of (d), or the series of processes of (a), (b) and (c), $R_2$ updates are performed. While $R_1$ is set at a predetermined number in the present embodiment, the present invention is not limited to this setup. For instance, the iterations may be arranged to be stopped when the absolute value of the difference between the value of Q of Equation (26) with g of rth iteration and that with g of (r+1)th iteration is computed is smaller than (or equal to) a predetermined positive small value $\epsilon$. In the same manner, while $R_2$ is set at a predetermined number in the present embodiment, the present invention is not limited to this setup. For instance, iterations may be arranged to be stopped when the absolute value of the difference between the value of Q of Equation (26) with g of uth iteration and that with g of (u+1)th iteration is smaller than (or equal to) a predetermined positive small value $\epsilon$.

(Step S100)

Inverse filter application unit (14) calculates an ad-hoc signal y(t) by applying an inverse filter to an observed signal $x(t)=[x_1(t), \ldots, x_m(t), \ldots, x_M(t)]^T$ according to Equation (42). While the ad-hoc signal y(t) is identical to a restored signal in the a calculational perspective, the term ad-hoc signal will be used in the present description in order to clearly specify that the signal so termed is not the restored signal calculated via $R_1$ processes as described later. Here, t takes all sample numbers, i.e. $1 \leqq t \leqq N$, where N is the total number of samples. For the first embodiment, the number of microphones, M, is 1 or greater.

$$y(t) = \sum_{m=1}^{M} \sum_{k=0}^{L} g_m(k) x_m(t-k) \tag{42}$$

As a coefficient sequence $\{g_m(k); 0 \leqq k \leqq L\}$ of the inverse filter, a predetermined initial value will be used for the first iteration of $R_1$ iterations, and the inverse filter $g^{\wedge(r+1)}$ calculated by the inverse filter calculation unit (13), to be described later, will be used for the second and subsequent iterations.

(Step S101)

Prediction error filter calculation unit (15) comprises a segmentation processing unit (151) which performs the segmentation processing and a frame prediction error filter calculation unit (152). The frame prediction error filter calculation unit (152) comprises frame prediction error filter calculation unit (152*i*) for the ith frame which calculates a prediction error filter from the ad-hoc signal of the ith frame, where i is an integer that satisfies $1 \leqq i \leqq F$.

The segmentation processing unit (151) performs the segmentation processing on the ad-hoc signal $\{y(t); 1 \leqq t \leqq N\}$ calculated by the inverse filter application unit (14). The segmentation processing is performed by, as shown in Equation (43) for instance, applying a window function that excerpts a frame signal of W point length with every W point shift. $\{y_i(n);\ 1\leqq n\leqq W\}$ represents an ad-hoc signal sequence included in the ith frame.

$$y_i(n)=y((i-1)W+n) \quad (43)$$

Then, the prediction error filter calculation unit (**152*i***) for the ith frame performs the Pth order linear prediction analysis on the ad-hoc signal $\{y_i(n);\ 1\leqq n\leqq W\}$ of the ith frame in accordance with Equation (22), and calculates prediction error filter coefficients $\{a_i(k);\ 1\leqq k\leqq P\}$. Refer to Reference literature 1 described above for details of this computation. $a_1(\mathbf{1}), \ldots, a_1(P), \ldots, a_i(\mathbf{1}), \ldots, a_i(P), \ldots, a_F(\mathbf{1}), \ldots, a_F(P)$ obtained by this calculation gives $\hat{a}^{(r+1)}$ in Equation (22).

(Step S102)

An exemplary functional configuration of the inverse filter calculation unit (13) will be described with reference to FIG. 4. The inverse filter calculation unit (13) comprises gradient calculation unit (131), inverse filter update unit (132) and updated inverse filter application unit (133). Furthermore, the gradient calculation unit (131) comprises: first prediction error filter application unit (1311) that applies prediction error filters to the observed signal; second prediction error filter application unit (1312) that applies prediction error filters to the signal (updated inverse filter-applied signal) obtained by applying an updated inverse filter to the observed signal; and gradient vector calculation unit (1313). Here, the updated inverse filter corresponds to $g^{<u>}$ in Formula (27).

The first prediction error filter application unit (1311) segments the signal $x_m(t)$ observed by the mth $(1\leqq m\leqq M)$ microphone into frames, and for each frame, calculates a prediction error filter-applied signal $v_{mi}(n)$ by applying the ith prediction error filter $a_i(k)$ obtained through step S101 to the ith frame signal $x_{mi}(n)$ (refer to Equation (31)). An example of the details of the processing described here will be given in the description of the third embodiment to be provided later.

The second prediction error filter application unit (1312) segments the updated inverse filter-applied signal y(t) into frames, and for each frame, calculates an innovation estimate $d_i(\mathbf{1}), \ldots, d_i(W)$ by applying the ith prediction error filter $a_i(k)$ obtained through step S101 to the ith frame signal $y_i(n)$ (refer to Equation (30)). The signal obtained through step S100 may be used as an initial value of the updated inverse filter-applied signal y(t). Subsequently, the second prediction error filter application unit (1312) accepts as input the updated inverse filter-applied signal y(t), which is output by the updated inverse filter application unit (133) to be described later. An example of the details of the processing described here will be given in the description of the third embodiment to be provided later.

The gradient vector calculation unit (1313) calculates a gradient vector $\nabla Q_g$ of the present updated inverse filter $g^{<u>}$ using the signal $v_{mi}(n)$ and the innovation estimate $d_i(n)$ (refer to Equations (28) and (29)). When calculating Equation (29) using finite samples of $v_{mi}(n)$ and $d_i(n)$, the expectation value E may be estimated from the samples. An example of the details of the processing described here will be given in the description of the third embodiment to be provided later.

The inverse filter update unit (132) calculates the u+1th updated inverse filter $g^{<u+1>}$ according to Formula (27), by using the present updated inverse filter $g^{<u>}$, a learning rate $\eta(u)$ and the gradient vector $\nabla Q_g$. In Formula (27), once $g^{<u+1>}$ is calculated, the value of $g^{<u>}$ is newly replaced by that of $g^{<u+1>}$.

The updated inverse filter application unit (133) calculates the updated inverse filter-applied signal y(t) according to Equation (42), by using $g^{<u+1>}$ obtained by the inverse filter update unit (132), or the new $g^{<u>}$, and the observed signal x(t). In short, the calculation is performed by replacing $g_m(k)$ in Equation (42) by using g obtained by the u+1th update. The updated inverse filter-applied signal y(t) obtained by this calculation will become the input to the second prediction error filter application unit (1312). While the updated inverse filter-applied signal y(t) is identical to the restored signal in the a calculational perspective, the term updated inverse filter-applied signal will be used in the present description in order to clearly specify that the signal so termed is not the restored signal calculated via $R_1$ processes to be described later, but a signal calculated in order to perform the update rule.

$g^{<R2+1>}$ obtained as the result of $R_2$ updates performed under the control of the control unit (600) corresponds to $\hat{g}^{(r+1)}$ of Equation (25). The superscript R2 is $R_2$. The inverse filter calculation unit (13) outputs $\hat{g}^{(r+1)}$.

Under the control of the control unit (500), $\hat{g}^{(R1+1)}$ is obtained by incrementing r by 1 every time the above-described processing series is performed until r reaches $R_1$ or, in other words, by performing $R_1$ iterations of the above-described processing series (step S103). The superscript R1 is $R_1$. This $\hat{g}^{(R1+1)}$ is considered to be the optimal solution for Equation (16). Accordingly, after obtaining $\hat{g}^{(R1+1)}$, the inverse filter application unit (14) will be able to obtain the restored signal y(t) by applying the inverse filter $\hat{g}^{(R1+1)}$ to the observed signal $x(t)=[x_1(t), \ldots, x_M(t)]^T$ according to Equation (42) (step S104).

<Second Embodiment>

The second embodiment corresponds to a modification of the first embodiment. More specifically, the second embodiment is an embodiment in which the pre-whitening described in §3 is performed. Thus, the portions that differ from the first embodiment will be described with reference to FIGS. 6 and 7. Incidentally, since the pre-whitening is a pre-process that is performed on an observed signal, the embodiment, involving the pre-whitening described here is also applicable to the third embodiment to be described later.

For the second embodiment, a program that calculates a whitening filter and a program that applies the whitening filter to the observed signal is also stored in the external storage device (17) (or a ROM and the like) of the signal distortion elimination apparatus (1).

In the signal distortion elimination apparatus (1) of the second embodiment, the respective programs and data necessary to execute the respective programs which are stored in the external storage device (17) (or the ROM or the like) are read into the RAM (15) when required, and then interpreted, executed and processed by the DSP (14). As a result, as long as the DSP (14) realizes predetermined functions (the inverse filter application unit, the prediction error filter calculation unit, the inverse filter calculation unit, the whitening filter calculation unit, the whitening filter application unit), the signal distortion elimination is achieved.

(Step S**100*a***)

Whitening filter calculation unit (11) calculates, via the Xth order linear prediction analysis, coefficients $\{f_m(k);\ 0\leqq k\leqq X\}$ of a filter (whitening filter) that whitens the entire observed signal $\{x_m(t);\ 1\leqq t\leqq N\}$ obtained by each microphone. All the calculation involved is the linear prediction analysis. Refer to Reference literature 1 described before. The coefficients of the whitening filter will become inputs to whitening filter application unit (12).

(Step S**100*b***)

In accordance with Equation (39), the whitening filter application unit (12) applies the above-mentioned whitening filter to the signal observed by each microphone and obtains a whitened signal $w_m(t)$. As described earlier, since Equation (31) is replaced by Equation (40), the processing performed by the inverse filter calculation unit (13), particularly by the first prediction error filter application unit (1311), in the first embodiment should be modified to calculation based on Equation (40) instead of Equation (31). In addition, the calculation executed by the inverse filter application unit (14) in the first embodiment should be modified to calculation based on Equation (44) instead of Equation (42). After step S100*b*, steps S100 to S104 of the first embodiment are performed, in which the observed signal in the respective steps of the first embodiment is replaced by the whitened signal obtained through step S100*b*. To highlight this fact, in FIG. 7, process reference characters corresponding to the respective processes of steps S100 to S104 of the first embodiment are affixed with the symbol '.

$$y(t) = \sum_{m=1}^{M} \sum_{k=0}^{L} g_m(k) w_m(t-k) \quad (44)$$

EXAMPLE 1

Results of demonstration experiments of the second embodiment conducted by the present inventors will now be described. The following experimental conditions were used: the number of microphones M=4; the order of the whitening filter X=500; the order of the inverse filter L=1000; the number of samples excerpted by the window function (the number of samples per frame) W=200; the order of the prediction error filter P=16; the number of iterations $R_1$=10; and the number of updates of the inverse filter calculation unit $R_2$=20. The initial value of the learning rate η(u) was set to 0.05, and if the value of Equation (26) decreased due to Formula (27), the value of η(u) was recursively reduced by half until the value of Equation (26) increased. The initial inverse filter to be input to the inverse filter application unit (14) shown in FIG. 6 was set as Equation (45).

$$g_m(k) = \begin{cases} 1/M & k = 200 \\ 0 & \text{otherwise} \end{cases}, \; 1 \le m \le M \quad (45)$$

The effect of the second embodiment according to the present invention was evaluated by using a $D_{50}$ value (the ratio of the energy up to the first 50 msec to the total energy of impulse responses) as a measure of signal distortion elimination. Speech of a male speaker and a female speaker was taken from a continuous speech database, and observed signals were synthesized by convolving impulse responses measured in a reverberation room having a reverberation time of 0.5 seconds.

Figure 6:
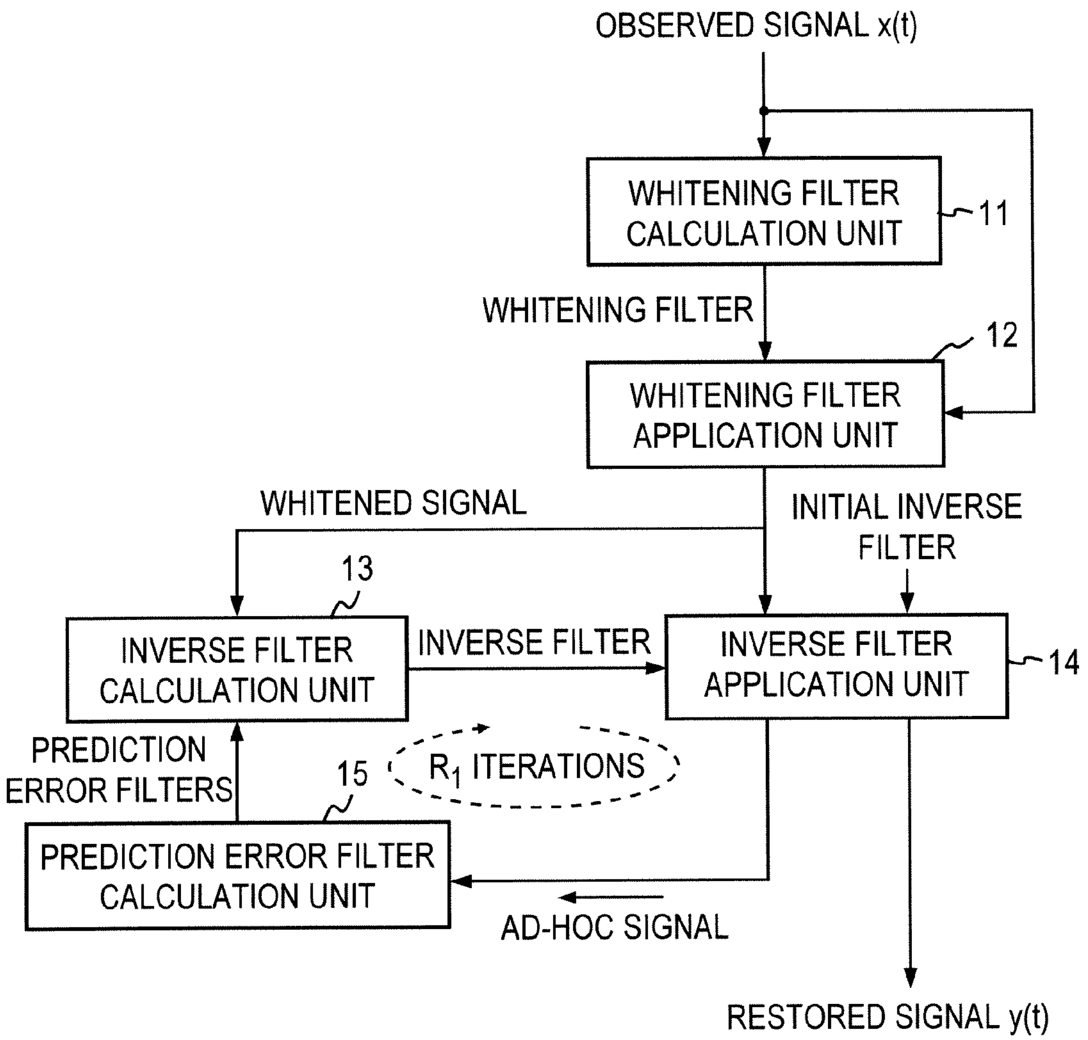
FIG. 6 is a functional block diagram showing a functional configuration example of the signal distortion elimination apparatus (1) according to a second embodiment.
Figure 7:
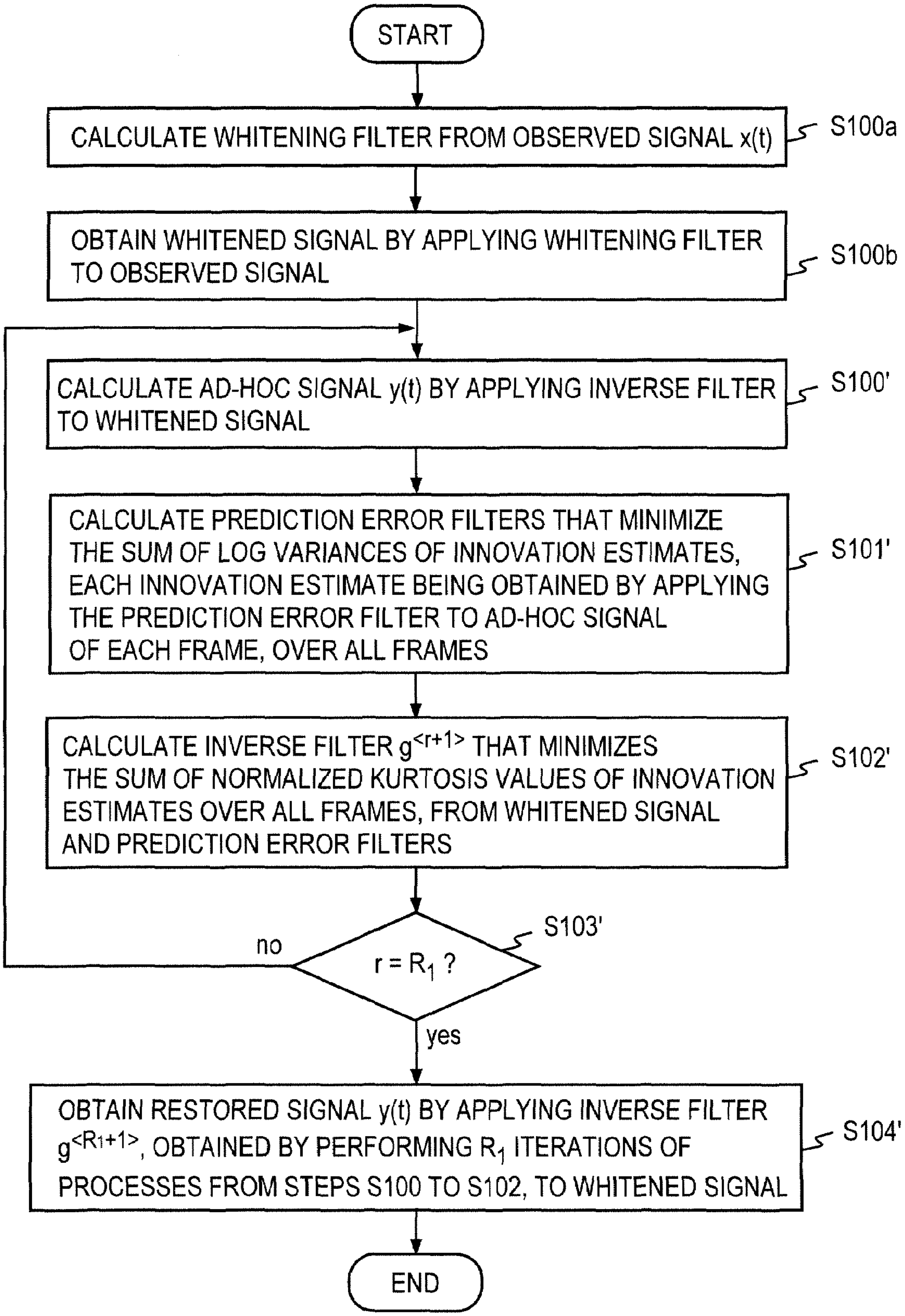
FIG. 7 is a process flow diagram showing a flow of signal distortion elimination processing according to the second embodiment.
Figure 8:
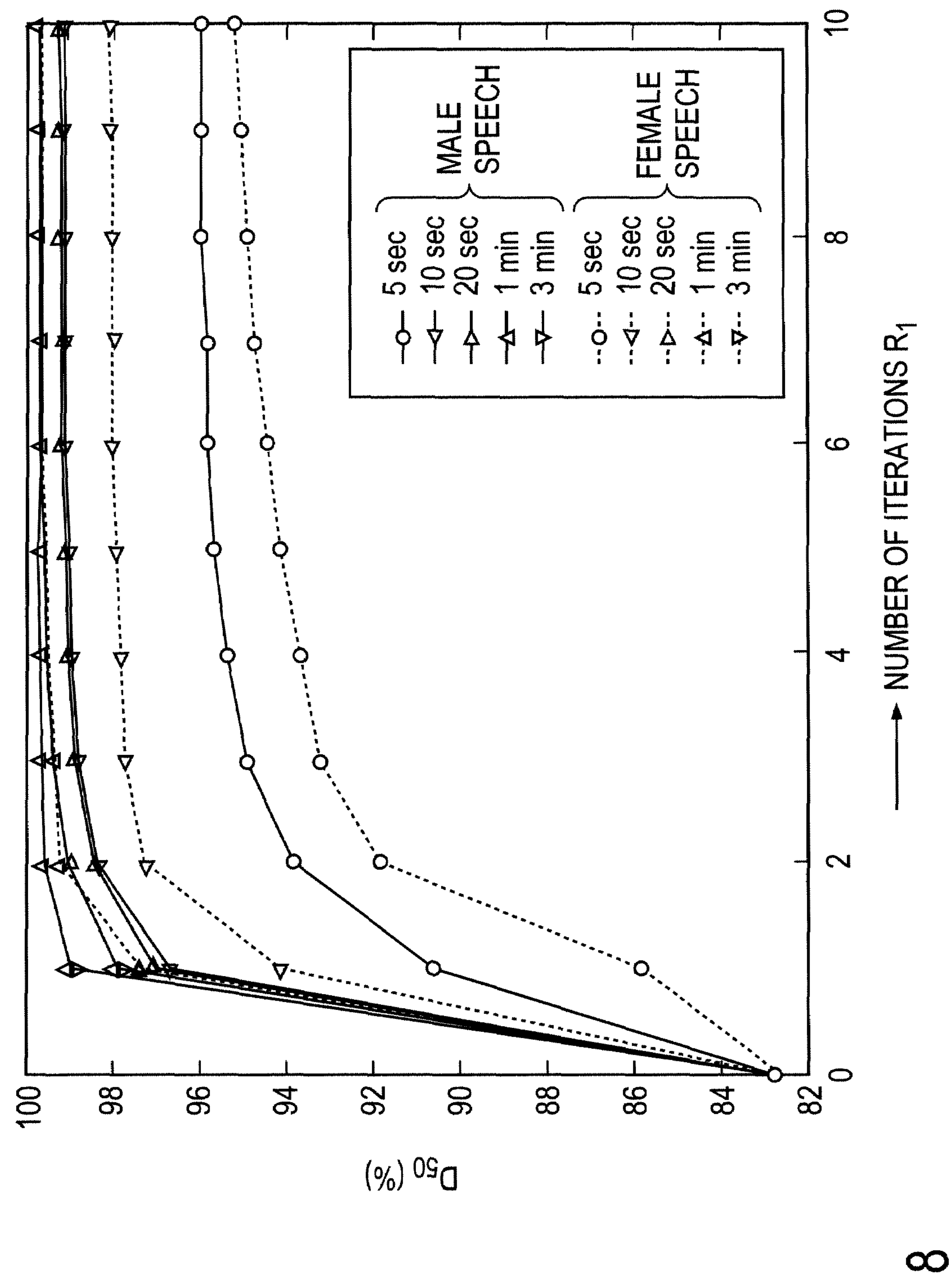
FIG. 8 is a diagram showing a relationship between iteration counts $R_1$ and a $D_{50}$ value when observed signal length N is varied to 5 seconds, 10 seconds, 20 seconds, 1 minute and 3 minutes.

FIG. 8 shows the relationship between the number of iterations $R_1$ (the number of calculations of the inverse filter by executing a series of processes comprising of the inverse filter application unit (14), the prediction error filter calculation unit (15) and the inverse filter calculation unit (13) shown in FIG. 6) and the $D_{50}$ value when the observed signal length N was set at 5 seconds, 10 seconds, 20 seconds, 1 minute and 3 minutes. In every case, the $D_{50}$ value improved as the number of iterations increased. Thus, the effect of the iterative processing is obvious. In particular, it can be seen that the $D_{50}$ value significantly increased by the iterative processing for relatively short observed signal lengths of 5 to 10 seconds.

Furthermore, the effect of the second embodiment according to the present invention was evaluated by comparing speech spectrograms.

Figures 9A, 9B, 9C:
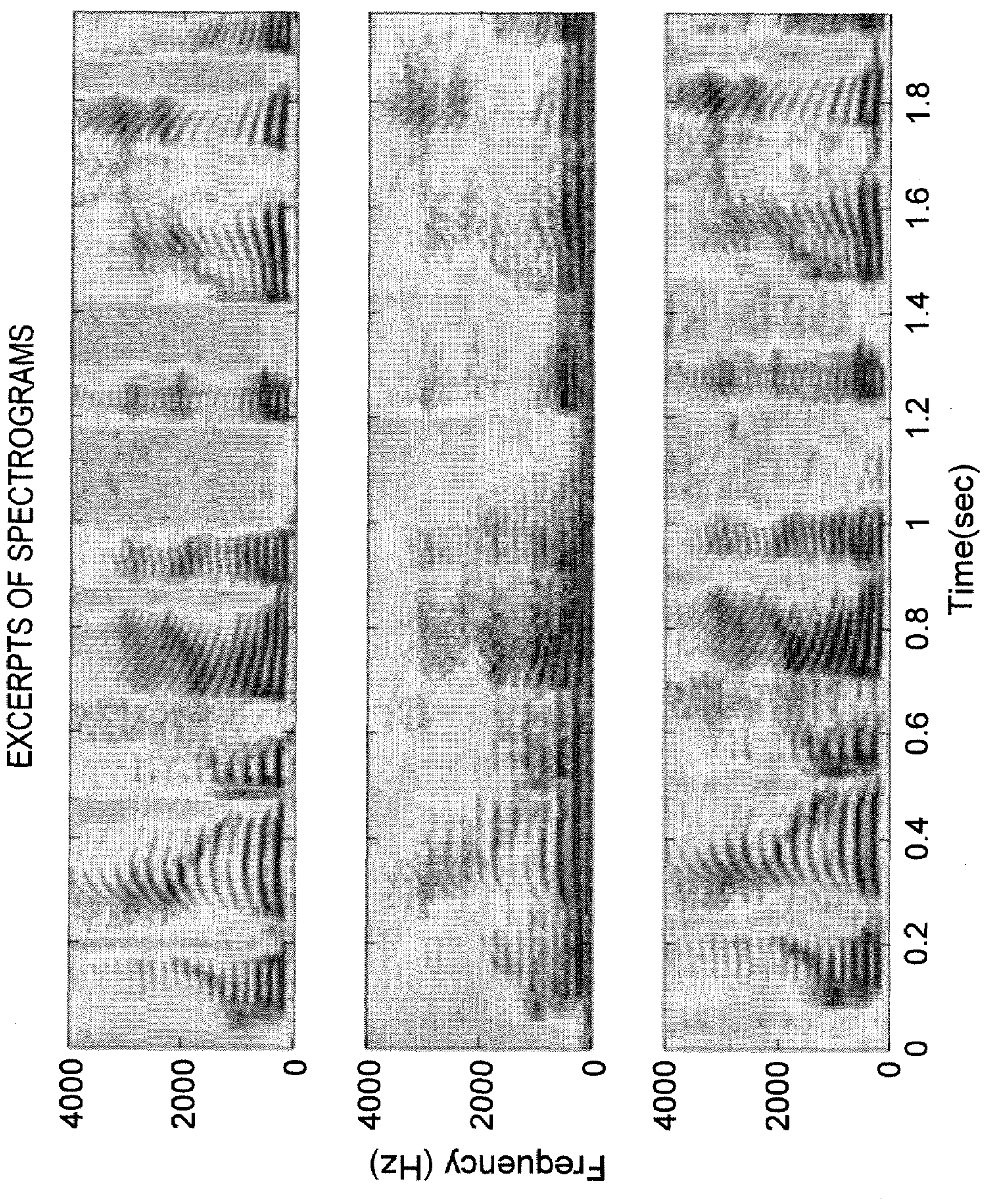
FIG. 9A is a spectrogram of speech that does not include reverberation.
FIG. 9B is a spectrogram of speech that includes reverberation.
FIG. 9C is a spectrogram of speech after dereverberation.

FIG. 9A shows an excerpt of the spectrogram of the speech that does not include reverberation (original speech) obtained when the observed signal length was 1 minute; FIG. 9B shows an excerpt of the spectrogram of the reverberant speech (observed speech) obtained when the observed signal length was 1 minute; and FIG. 9C shows an excerpt of the spectrogram of the dereverberated speech (restored speech) obtained when the observed signal length was 1 minute. By comparing FIG. 9A with FIG. 9C and FIG. 9B with FIG. 9C, it can be seen that the reverberation included in the observed signal was suppressed, and the harmonic structure and the formant structure which are characteristics inherent in the original speech were restored.

Moreover, the effect of the second embodiment of the present invention was evaluated using LPC spectral distortion.

Figure 10A:
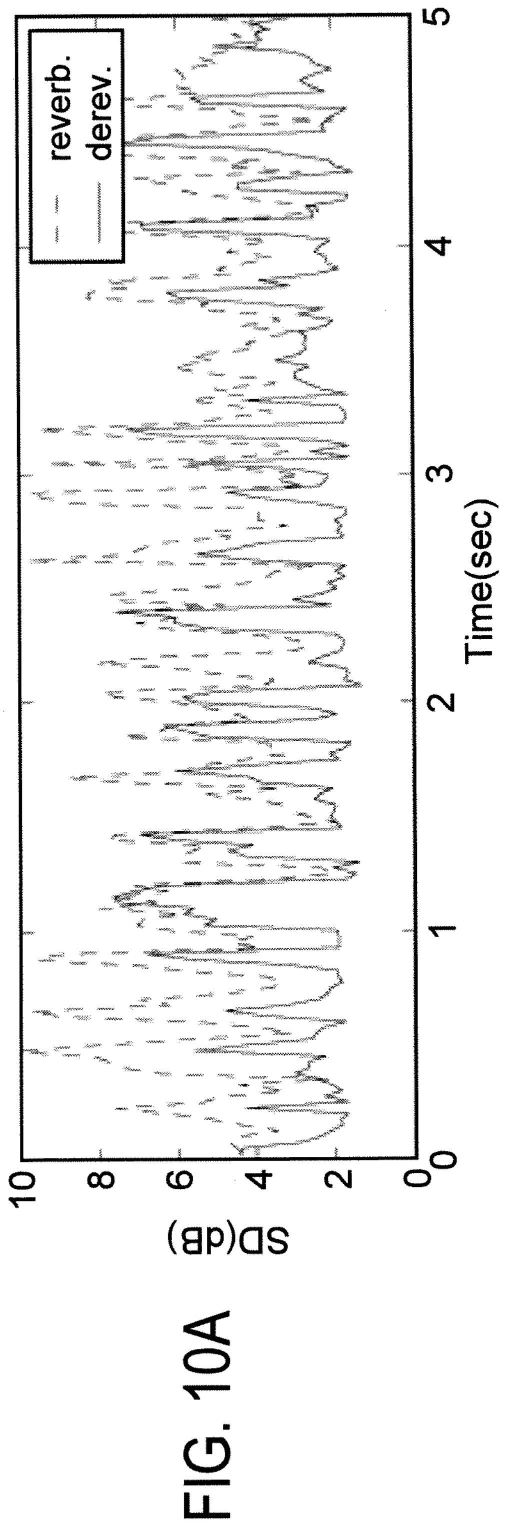
FIG. 10A is a graph for explaining temporal fluctuation of an LPC spectral distortion of a dereverberated speech.
Figure 10B:
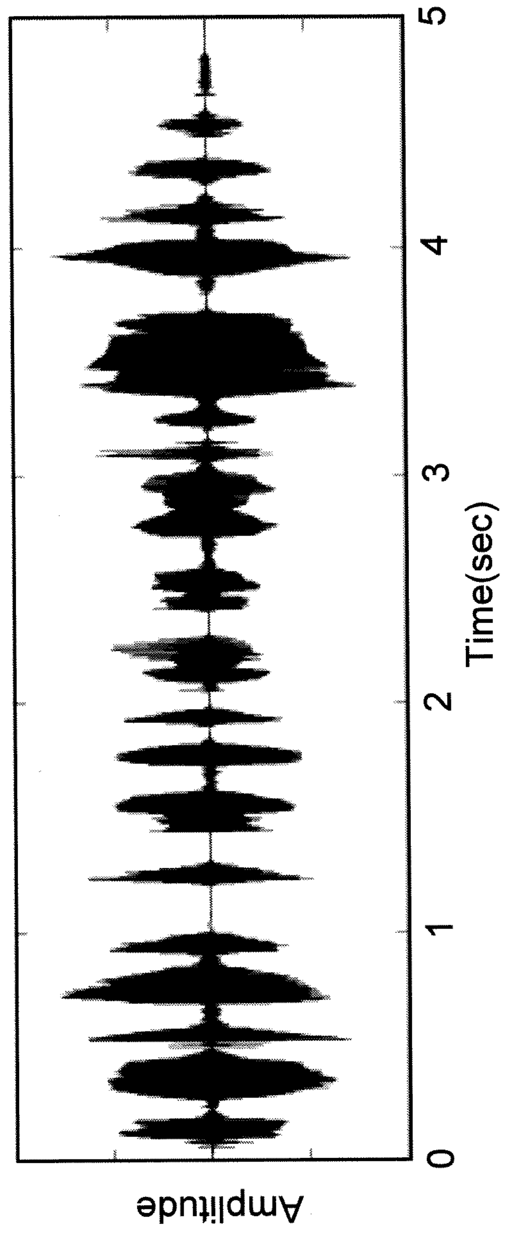
FIG. 10B shows excerpts of original speech signals for a corresponding segment.

FIG. 10B shows the waveform of an original speech, while FIG. 10A shows the time series of the LPC spectral distortion between the original speech and the observed speech (denoted by the dotted line) and the time series of the LPC spectral distortion between the original speech and the restored speech (denoted by the solid line). The respective abscissas of FIGS. 10A and 10B represent a common time scale in second. The ordinate of FIG. 10B represents amplitude values. However, since it will suffice to show relative amplitudes of the original signal, units are not shown for the ordinate. The ordinate of FIG. 10A represents the LPC spectral distortion SD (dB).

From FIG. 10A, it can be seen that the time series of the LPC spectral distortion between the original speech and the restored speech (denoted by the solid line) is always smaller than the time series of the LPC spectral distortion between the original speech and the observed speech (denoted by the dotted line). Indeed, while the LPC spectral distortions for the observed speech was 5.39 dB or average and the variance was 4.20 dB. On the other hand, the LPC spectral distortions for the restored speech was 2.38 dB on average and the variance was 2.00 dB.

In addition, comparing FIG. 10A with FIG. 10B, it can be seen that for the segments (for instance, refer to the segment of around 1.0 to 1.2 seconds) in which the LPC spectral distortion between the original speech and the restored speech (denoted by the solid line) are large, the amplitude values of the original speech waveform are substantially 0. In reality, these segments are silent segments with no speech. Therefore, the distortion actually perceived was considerably reduced. Thus, the time series of the LPC spectral distortion between the original speech and the restored speech (denoted by the solid line) was considerably smaller than that of the LPC spectral distortion between the original speech and the observed speech (denoted by the dotted line). Therefore, it may be concluded that the spectrum of the original speech was restored with high accuracy.

<Third Embodiment>

The third embodiment corresponds to a modification of the first embodiment. More specifically, the third embodiment is an embodiment in which the signal distortion elimination based on second order statistics, described in §2, is performed. Thus, the portions that differ from the first embodiment will be described with reference to FIGS. 11 and 12. However, for the third embodiment, the number of microphones M shall be set at two or greater.

The processing of steps S100 and S101 is the same as in the first embodiment.

The processing of step S102*a* is performed following the processing of step S101.

Figure 11:
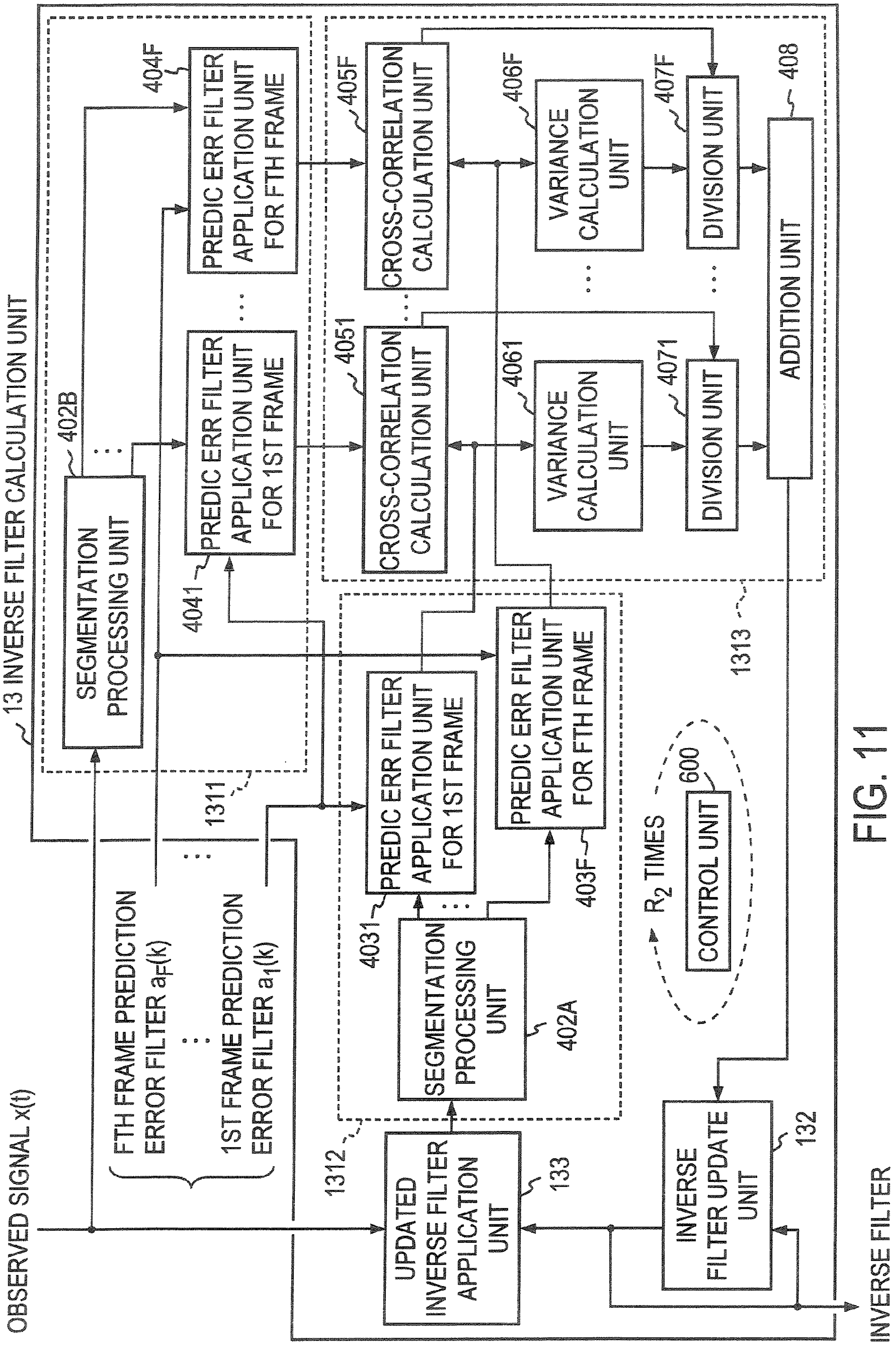
FIG. 11 is a functional block diagram showing a functional configuration example of the inverse filter calculation unit (13) of the signal distortion elimination apparatus (1) according to a third embodiment.
Figure 12:
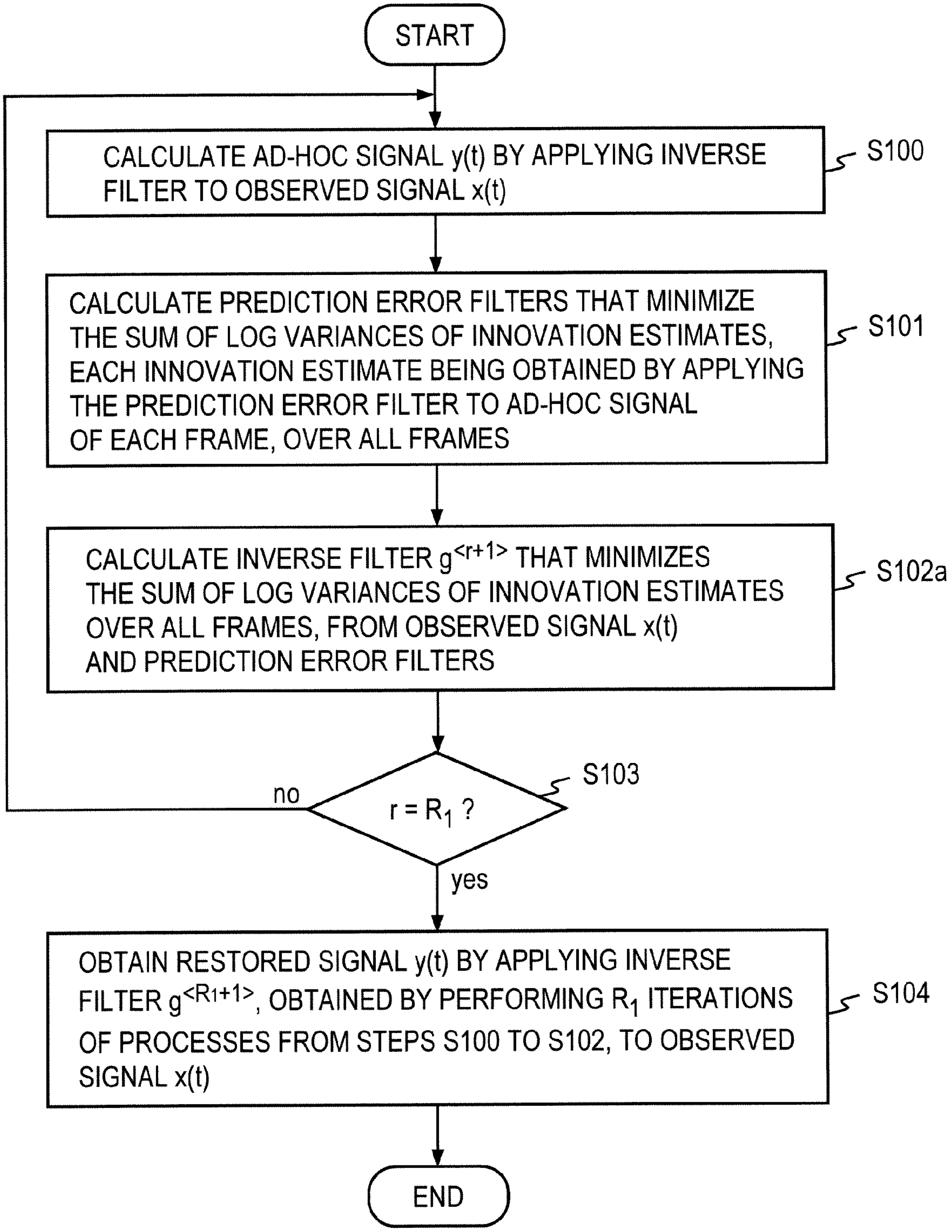
FIG. 12 is a process flow diagram showing a flow of signal distortion elimination processing according to the third embodiment.

An exemplary functional configuration of the inverse filter calculation unit (13) according to the third embodiment will be described with reference to FIG. 11.

The inverse filter calculation unit (13) comprises: first prediction error filter application unit (1311) that applies prediction error filters to the observed signal; second prediction error filter application unit (1312) that applies prediction error filters to the signal (updated inverse filter-applied signal) obtained by applying an updated inverse filter to the observed signal; gradient vector calculation unit (1313); inverse filter update unit (132); and updated inverse filter application unit (133). In this case, the updated inverse filter corresponds to $g_m(k)$ of Equation (37).

The first prediction error filter application unit (1311) segments the signal $x_m(t)$ observed by the mth ($1 \leqq m \leqq M$) microphone into frames, and for each frame, calculates a prediction error filter-applied signal $v_{mi}(n)$ by applying the ith prediction error filter $a_i(k)$ obtained through step S101 to the ith frame signal $x_{mi}(n)$ (refer to Equation (38)). More specifically, segmentation processing unit (402B) segments the input observed signal $x_m(t)$ into frames, and outputs the ith frame signal $x_{mi}(n)$ of the observed signal $x_m(t)$. Then, prediction error filter application unit (404*i*) outputs the signal $v_{mi}(n)$ from input signal $x_{mi}(n)$ according to Equation (38). In these procedures, i takes the value of $1 \leqq i \leqq F$.

The second prediction error filter application unit (1312) segments the updated inverse filter-applied signal y(t) into frames, and for each frame, calculates an innovation estimate $d_i(\mathbf{1}), \ldots, d_i(W)$ by applying the ith prediction error filter $a_i(k)$ obtained through step S101 to the ith frame signal $y_i(n)$ (refer to Equation (30)). The signal obtained through step S100 may be used as an initial value of the updated inverse filter-applied signal y(t). More specifically, except for the case of the first iteration, segmentation processing unit (402A) segments the updated inverse filter-applied signal y(t) output by the updated inverse filter application unit (133) to be described later, and then outputs the ith frame signal $y_i(n)$. Then, prediction error filter application unit (403*i*) outputs the innovation estimate $d_i(\mathbf{1}), \ldots, d_i(W)$ in accordance with Equation (30) from input $y_i(n)$, where $1 \leqq i \leqq F$.

The gradient vector calculation unit (1313) calculates a gradient vector of the present updated inverse filter $g_m(k)$ using the signal $v_{mi}(n)$ and the innovation estimate $d_i(n)$ (refer to the second term of the right-hand side of Equation (37)). More specifically, for each frame number i ($1 \leqq i \leqq F$), cross-correlation calculation unit (405*i*) calculates the cross-correlation $<d_i(n)v_{mi}(n-k)>_{n=1}{}^W$ between the signal $v_{mi}(n)$ and the innovation estimate $d_i(n)$. In addition, for each frame number i ($1 \leqq i \leqq F$), variance calculation unit (406*i*) calculates the variance $<d_i(n)^2>_{n=1}{}^W$ of the innovation estimate $d_i(\mathbf{1}), \ldots, d_i(W)$. For each frame number i ($1 \leqq i \leqq F$), division unit (407*i*) calculates $<d_i(n)v_{mi}(n-k)>_{n=1}{}^W/<d_i(n)^2>_{n=1}{}^W$. Addition unit (408) calculates the sum of the outputs of the division units (4071) to (407F) over all the frames. The result is the second term of the right-hand side of Equation (37).

The inverse filter update unit (132) calculates the u+1th updated inverse filter $g_m(k)'$ according to Equation (37), using the present updated inverse filter $g_m(k)$, a learning rate δ and the gradient vector. In Equation (37), once $g_m(k)'$ is calculated, the values of $g_m(k)$ is newly replaced by that of $g_m(k)'$.

The updated inverse filter application unit (133) calculates the updated inverse filter-applied signal y(t) according to Equation (42), by using $g_m(k)'$ obtained by the inverse filter update unit (132), or the new $g_m(k)$, and the observed signal x(t). In other words, the updated inverse filter application unit (133) performs Equation (42) by using g obtained by the (u+1)th update as $g_m(k)$ of Equation (42). The updated inverse filter-applied signal y(t) obtained by this calculation will become the input to the second prediction error filter application unit (1312).

The processing of steps S103 and S104 performed following the processing of step S102*a* are the same as that of the first embodiment. Thus, a description thereof will be omitted.

EXAMPLE 2

Results of demonstration experiments of the third embodiment conducted by the present inventors will now be described. The following experimental conditions were used: M=4; L=1000; W=200; P=16; $R_1$ =6; and $R_2$=50. The initial value of the learning rate δ was set at 0.05, and if where the value of $$\sum_{i=1}^{F} \log < d_i(n)^2 >_{n=1}^{W}$$

increased, the value of δ was recursively reduced by half until the value of $$\sum_{i=1}^{F} \log < d_i(n)^2 >_{n=1}^{W}$$

decreased. The initial estimate of the inverse filter was $g_m(k)=0$, $1 \leqq m \leqq M$, $1 \leqq k \leqq L$.

The effect of the third embodiment of the present invention was evaluated using RASTI (refer to Reference literature 5), which indicates speech intelligibility, as a measure for assessing dereverberation performance. Speech of five male speakers and five female speakers was taken from a continuous speech database, and observed signals were synthesized by convolving impulse responses measured in a reverberation room having a reverberation time of 0.5 seconds.

(Reference literature 5) H. Kuttruff. Room acoustics. Elsevier Applied Science, third edition, P.237 1991.

Figure 13:
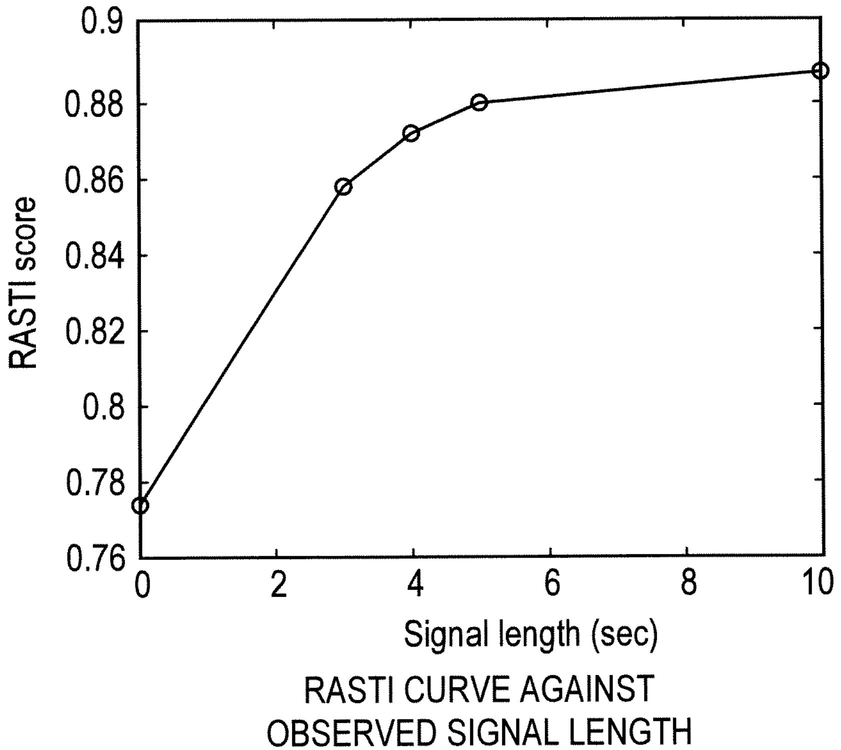
FIG. 13 is a plot of RASTI values corresponding to observed signals of 3 seconds, 4 seconds, 5 seconds and 10 seconds.

FIG. 13 plots the RASTI values obtained by using observed signals of 3 seconds, 4 seconds, 5 seconds and 10 seconds set as N. As shown in FIG. 13, it can be seen that high-performance dereverberation was achieved even for short observed signals of 3 to 5 seconds.

Figure 14:
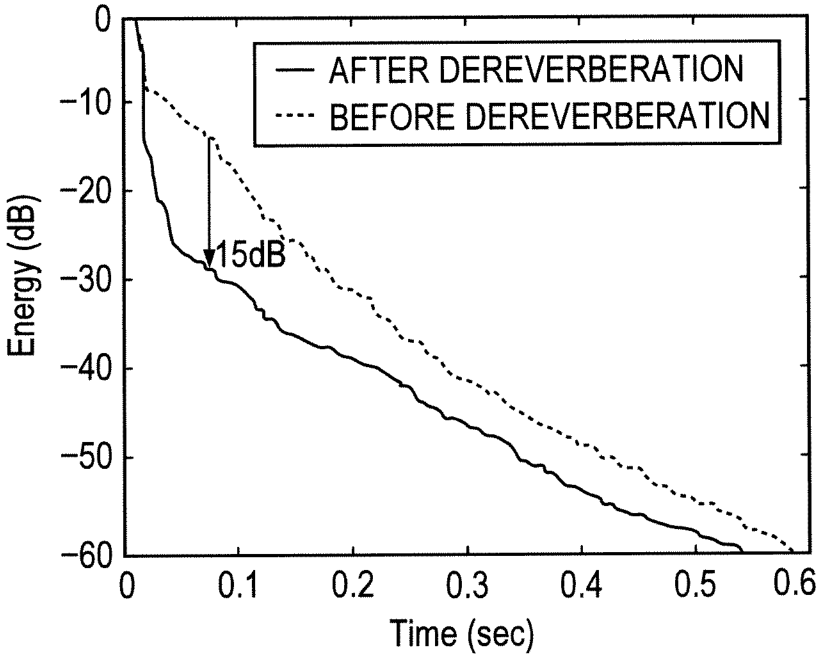
FIG. 14 is a plot showing an example of energy decay curves before and after dereverberation.
Figure 15:
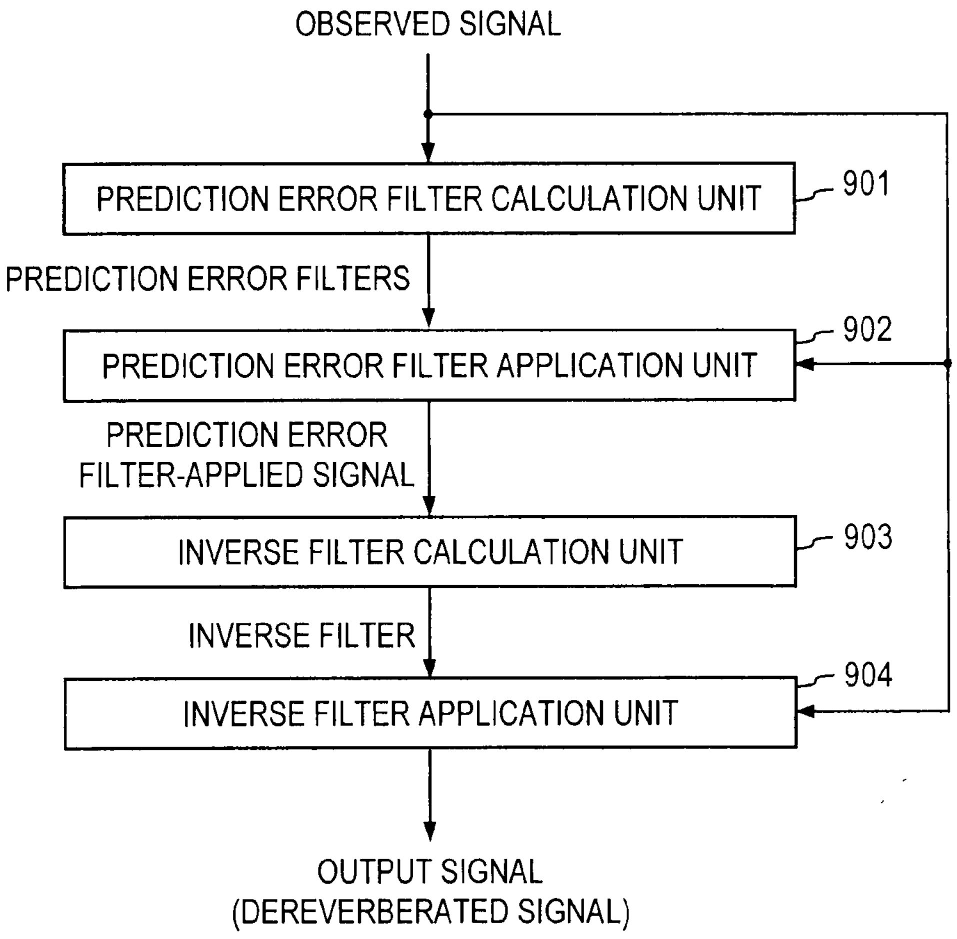
FIG. 15 is a functional block diagram for explaining prior art.

FIG. 14 shows examples of the energy decay curves before and after dereverberation. It can be seen that the energy of the reflected sound after 50 milliseconds from the arrival of the direct sound was reduced by 15 dB.

INDUSTRIAL APPLICABILITY

Since the present invention is an elemental art that contributes to the improvement of performances of various signal processing systems, the present invention may be utilized in, for instance, speech recognition systems, television conference systems, hearing aids, musical information processing systems and so on.

What is claimed is:

1. A signal distortion elimination apparatus that eliminates signal distortion of an observed signal provided by a sensor to obtain a restored signal, said signal distortion elimination apparatus comprising:

an inverse filter application unit that receives an input of said observed signal provided by said sensor and an input of a filter to be applied to said observed signal provided by said sensor, hereinafter referred to as an inverse filter, applies said inverse filter to said observed signal provided by said sensor, and outputs the results thereof as said restored signal when a predetermined iteration termination condition is met and as an ad-hoc signal when said iteration termination condition is not met;

a prediction error filter calculation unit that receives an input of said ad-hoc signal without receiving an input of said observed signal provided by said sensor, segments said ad-hoc signal into frames, and outputs a prediction error filter of each of said frames obtained by performing linear prediction analysis on said ad-hoc signal of each frame;

an inverse filter calculation unit that receives an input of said observed signal provided by said sensor and an input of said prediction error filter of each of said frames and updates said inverse filter to be applied to said observed signal fed into said inverse filter application unit such that the samples of a concatenation of innovation estimates of said respective frames, hereinafter referred to as an innovation estimate sequence, become mutually independent, where said innovation estimate of a single frame is the signal obtained by applying said prediction error filter of the corresponding frame to the ad-hoc signal of the corresponding frame that is calculated by applying said inverse filter to said observed signal provided by said sensor; and a control unit that iteratively executes said inverse filter application unit, said prediction error filter calculation unit and said inverse filter calculation unit until the iteration termination condition is met.

2. The signal distortion elimination apparatus according to claim 1, wherein:

said prediction error filter calculation unit is configured to perform linear prediction analysis on the ad-hoc signal of each frame in order to calculate either a prediction error filter that minimizes the sum of the variances of said respective innovation estimates over all said frames or a prediction error filter that minimizes the sum of the log variances of said respective innovation estimates over all said frames, and outputs said prediction error filter for each frame; and said inverse filter calculation unit is configured to calculate an inverse filter that maximizes the sum of the normalized kurtosis values of said respective innovation estimates over all said frames as said inverse filter that makes said samples of said innovation estimate sequence become mutually independent, and outputs this inverse filter.

3. The signal distortion elimination apparatus according to claim 1, wherein:

said prediction error filter calculation unit is configured to perform linear prediction analysis on the ad-hoc signal of each frame in order to calculate either a prediction error filter that minimizes the sum of the variances of said respective innovation estimates over all said frames or a prediction error filter that minimizes the sum of the log variances of said respective innovation estimates over all said frames, and outputs said prediction error filter for each frame; and said inverse filter calculation unit is configured to calculate, as said inverse filter that makes said innovation estimate sequence become mutually independent, either an inverse filter that minimizes the sum of the variances of said respective innovation estimates over all said frames or an inverse filter that minimizes the sum of the log variances of said respective innovation estimates over all said frames, and outputs this inverse filter.

4. A signal distortion elimination apparatus that eliminates signal distortion of an observed signal provided by a sensor to obtain a restored signal, said signal distortion elimination apparatus comprising:

a whitening filter calculation unit that outputs a whitening filter obtained by performing linear prediction analysis on said observed signal;

a whitening filter application unit that outputs a whitened signal by applying said whitening filter to said observed signal;

an inverse filter application unit that receives an input of said whitened signal provided by said whitening filter application unit and an input of a filter to be applied to said whitened signal provided by said whitening filter application unit, hereinafter referred to as an inverse filter, applies said inverse filter to said whitened signal provided by said whitening filter application unit, and outputs the results thereof as said restored signal when a predetermined iteration termination condition is met and as an ad-hoc signal when said iteration termination condition is not met;

a prediction error filter calculation unit that receives an input of said ad-hoc signal without receiving an input of said observed signal provided by said sensor and without receiving an input of said whitened signal provided by said whitening filter application unit, segments said ad-hoc signal into frames, and outputs a prediction error filter of each of said frames obtained by performing linear prediction analysis on said ad-hoc signal of each frame;

an inverse filter calculation unit that receives an input of said whitened signal provided by said whitening filter application unit and an input of said prediction error filter of each of said frames and updates said inverse filter to be applied to said whitened filter fed into said inverse filter application unit such that the samples of a concatenation of innovation estimates of said respective frames, hereinafter referred to as an innovation estimate sequence, become mutually independent, where said innovation estimate of a single frame is the signal obtained by applying said prediction error filter of the corresponding frame to the ad-hoc signal of the corresponding frame that is calculated by applying said inverse filter to said whitened signal provided by said whitening filter application unit; and a control unit that iteratively executes said inverse filter application unit, said prediction error filter calculation unit and said inverse filter calculation unit until said iteration termination condition is met.

5. The signal distortion elimination apparatus according to any of claims 1 to 4, wherein:

said iteration termination condition is that the number of iterations is $R_1$, where $R_1$ is an integer satisfying $R_1>1$.

6. The signal distortion elimination apparatus according to any of claims 1 to 4, wherein:

said observed signal is a speech signal including signal distortion.

7. A signal distortion elimination method for eliminating signal distortion of an observed signal provided by a sensor to obtain a restored signal, said signal distortion elimination method comprising:

an inverse filter application step using a processor to receive an input of said observed signal provided by said sensor and an input of a filter to be applied to said observed signal provided by said sensor, hereinafter referred to as an inverse filter, apply said inverse filter to said observed signal obtained by said sensor and output the results thereof as said restored signal when a predetermined iteration termination condition is met and as an ad-hoc signal when said iteration termination condition is not met;

a prediction error filter calculation step using a processor to receive an input of said ad-hoc signal without receiving an input of said observed signal provided by said sensor, segment said ad-hoc signal into frames, and output a prediction error filter of each of said frames obtained by performing linear prediction analysis on said ad-hoc signal of each frame; and an inverse filter calculation step using a processor to receive an input of said observed signal provided by said sensor and an input of said prediction error filter of each of said frames and update said inverse filter to be applied to said observed signal fed into said inverse filter application step such that the samples of a concatenation of innovation estimates of said respective frames, hereinafter referred to as an innovation estimate sequence, become mutually independent, where said innovation estimate of a single frame is the signal obtained by applying said prediction error filter of the corresponding frame to the ad-hoc signal of the corresponding frame that is calculated by applying an inverse filter to said observed signal provided by said sensor; and a control step using a processor to iteratively execute said inverse filter application step, said prediction error filter calculation step and said inverse filter calculation step until said iteration termination condition is met.

8. The signal distortion elimination method according to claim 7, wherein:

said prediction error filter calculation step is adapted to perform linear prediction analysis on the ad-hoc signal of each frame in order to calculate either a prediction error filter that minimizes the sum of the variances of said respective innovation estimates over all said frames or a prediction error filter that minimizes the sum of the log variances of said respective innovation estimates over all said frames, and outputs said prediction error filter for each frame; and said inverse filter calculation step is adapted to calculate an inverse filter that maximizes the sum of the normalized kurtosis values of said respective innovation estimates over all said frames as said inverse filter that makes said innovation estimate sequence become mutually independent, and outputs this inverse filter.

9. The signal distortion elimination method according to claim 7, wherein:

said prediction error filter calculation step is adapted to perform linear prediction analysis on the ad-hoc signal of each frame in order to calculate either a prediction error filter that minimizes the sum of the variances of said respective innovation estimates over all said frames or a prediction error filter that minimizes the sum of the log variances of said respective innovation estimates over all said frames, and outputs said prediction error filter for each frame; and said inverse filter calculation step is adapted to calculate, as said inverse filter that makes said innovation estimate sequence become mutually independent, either an inverse filter that minimizes the sum of the variances of said respective innovation estimates over all said frames or an inverse filter that minimizes the sum of the log variances of said respective innovation estimates over all said frames, and outputs this inverse filter.

10. A signal distortion elimination method for eliminating signal distortion of an observed signal provided by a sensor to obtain a restored signal, said signal distortion elimination method comprising:

a whitening filter calculation step using a processor to output a whitening filter obtained by performing linear prediction analysis on said observed signal;

a whitening filter application step using a processor to output a whitened signal by applying said whitening filter to said observed signal;

an inverse filter application step using a processor to receive an input of said whitened signal provided by said whitening filter application step and an input of a filter to be applied to said whitened signal provided by said whitening filter application step, hereinafter referred to as an inverse filter, apply, said inverse filter to said whitened signal provided by said whitening filter application step, and output the results thereof as said restored signal when a predetermined iteration termination condition is met and as an ad-hoc signal when said iteration termination condition is not met;

a prediction error filter calculation step using a processor to receive an input of said ad-hoc signal without receiving an input of said observed signal provided by said sensor and without receiving an input of said whitened signal provided by said whitening filter application step, segment said ad-hoc signal into frames, and output a prediction error filter of each of said frames obtained by performing linear prediction analysis on said ad-hoc signal of each frame;

an inverse filter calculation step using a processor to receive an input of said whitened signal provided by said whitening filter application step and an input of said prediction error filter of each of said frames and update said inverse filter to be applied to said whitened filter fed into said inverse filter application step such that the samples of a concatenation of innovation estimates of said respective frames, hereinafter referred to as an innovation estimate sequence, become mutually independent, where said innovation estimate of a single frame is the signal obtained by applying said prediction error filter of the corresponding frame to the ad-hoc signal of the corresponding frame that is calculated by applying said inverse filter to said whitened signal provided by said whitening filter application step; and a control step using a processor to iteratively execute said inverse filter application step, said prediction error filter calculation step and said inverse filter calculation step until said iteration termination condition is met.

11. A non-transitory computer-readable recording medium having recorded thereon computer program to function a computer as a signal distortion elimination method according to any of claims 1 to 4.

12. The signal distortion elimination apparatus according to claim 5, wherein:

said observed signal is a speech signal including signal distortion.

* * * * *